United States Patent [19]

Kozuka et al.

[11] Patent Number: 4,582,418
[45] Date of Patent: Apr. 15, 1986

[54] VARIABLE MAGNIFICATION ELECTROSTATIC COPYING APPARATUS

[75] Inventors: Nobuhiko Kozuka, Suita; Hiromi Sakata, Neyagawa; Atsushi Kano, Amagasaki; Shigeo Koyama, Higashi Osaka, all of Japan

[73] Assignee: Mita Industrial Co., Ltd., Osaka, Japan

[21] Appl. No.: 555,005

[22] Filed: Nov. 21, 1983

[30] Foreign Application Priority Data

Nov. 30, 1982 [JP] Japan ................... 57-208488

[51] Int. Cl.⁴ ................... G03G 15/04; G03B 27/52
[52] U.S. Cl. ................... 355/8; 355/14 R; 355/55; 355/58
[58] Field of Search ................... 355/3 R, 8, 14 R, 55, 355/56, 58

[56] References Cited

U.S. PATENT DOCUMENTS

| | | | |
|---|---|---|---|
| 4,158,497 | 6/1979 | Suzuki et al. | 355/8 |
| 4,323,308 | 4/1982 | Kitajima et al. | 355/57 |
| 4,397,544 | 8/1983 | Yajima et al. | 355/58 |
| 4,441,805 | 4/1984 | Smith | 355/8 X |

FOREIGN PATENT DOCUMENTS

| | | |
|---|---|---|
| 0033185 | 8/1981 | European Pat. Off. . |
| 0080605 | 11/1982 | European Pat. Off. . |
| 0093307 | 4/1983 | European Pat. Off. . |
| 1552364 | 11/1968 | France . |
| 2253223 | 6/1975 | France . |
| 2363819 | 3/1978 | France . |
| 57-188068 | 11/1982 | Japan . |
| 2059083 | 4/1981 | United Kingdom . |

Primary Examiner—Fred L. Braun
Attorney, Agent, or Firm—Wenderoth, Lind & Ponack

[57] ABSTRACT

A variable magnification electrostatic copying apparatus includes a stationary transparent plate for placing thereon a document to be copied, an optical system including a first reflecting mirror assembly adapted to be moved reciprocally along the transparent plate, a second reflecting mirror assembly adapted to be moved reciprocally at a speed equal to one-half of the moving speed of the first reflecting mirror assembly and a lens assembly to be held at any one of a plurality of positions corresponding to a plurality of projecting ratios, and a projecting ratio changing device for moving the lens assembly and the second reflecting mirror assembly so as to change the projecting ratio of the optical system. The projecting ratio changing device includes a drive source in the form of a stepping motor, a control for controlling the operation of the drive source, a setting member for moving the second reflecting mirror assembly, a first power transmission system interposed between the drive source and the setting member and a second power transmission system interposed between the drive source and the lens assembly. The second reflecting mirror assembly is moved through the first power transmission system and the setting member, and the lens assembly is moved through the second power transmission system. An exposure correcting device includes plural plates movable between non-operating positions to respective operating positions controlling the area of exposure. The control includes high and low speed rotating plates and optical detectors for detecting positions thereof and for controlling the stepping motor.

23 Claims, 13 Drawing Figures

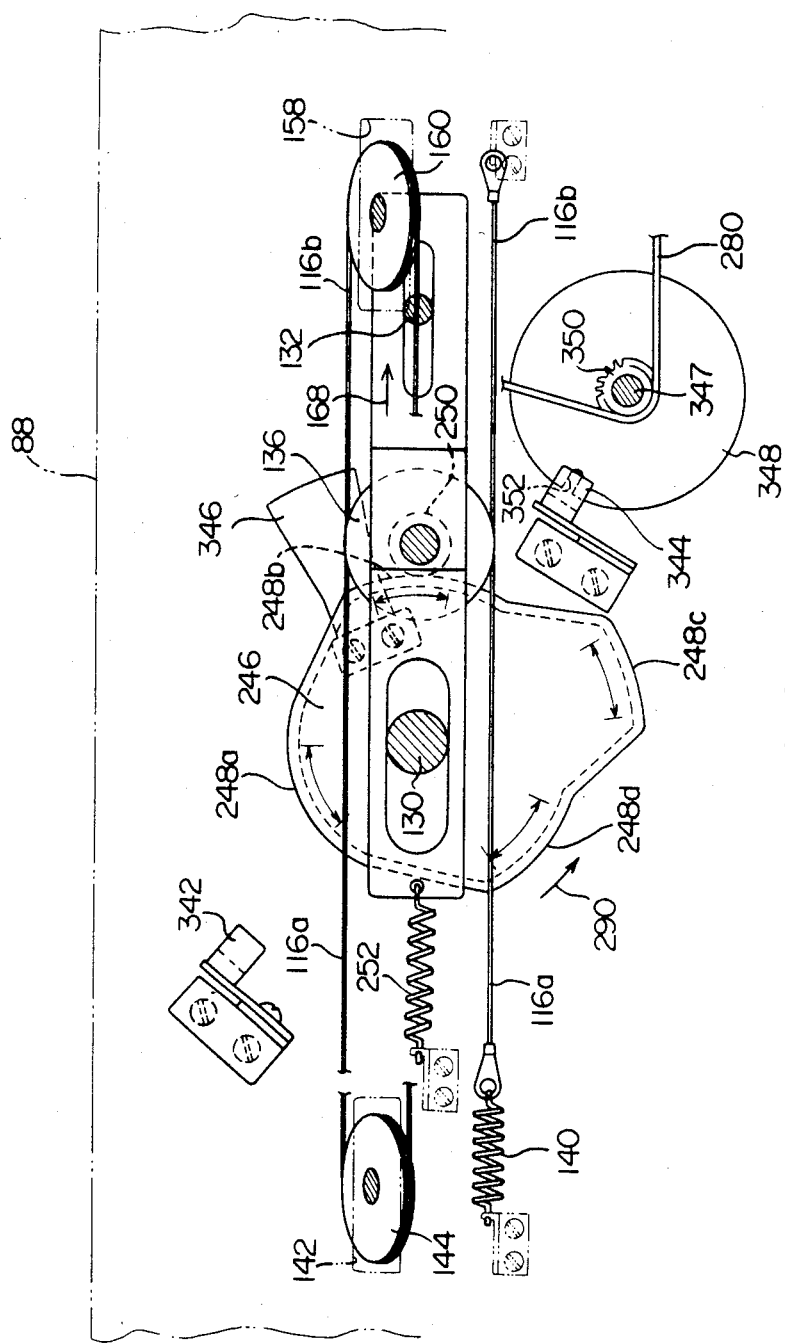
FIG. 9-A

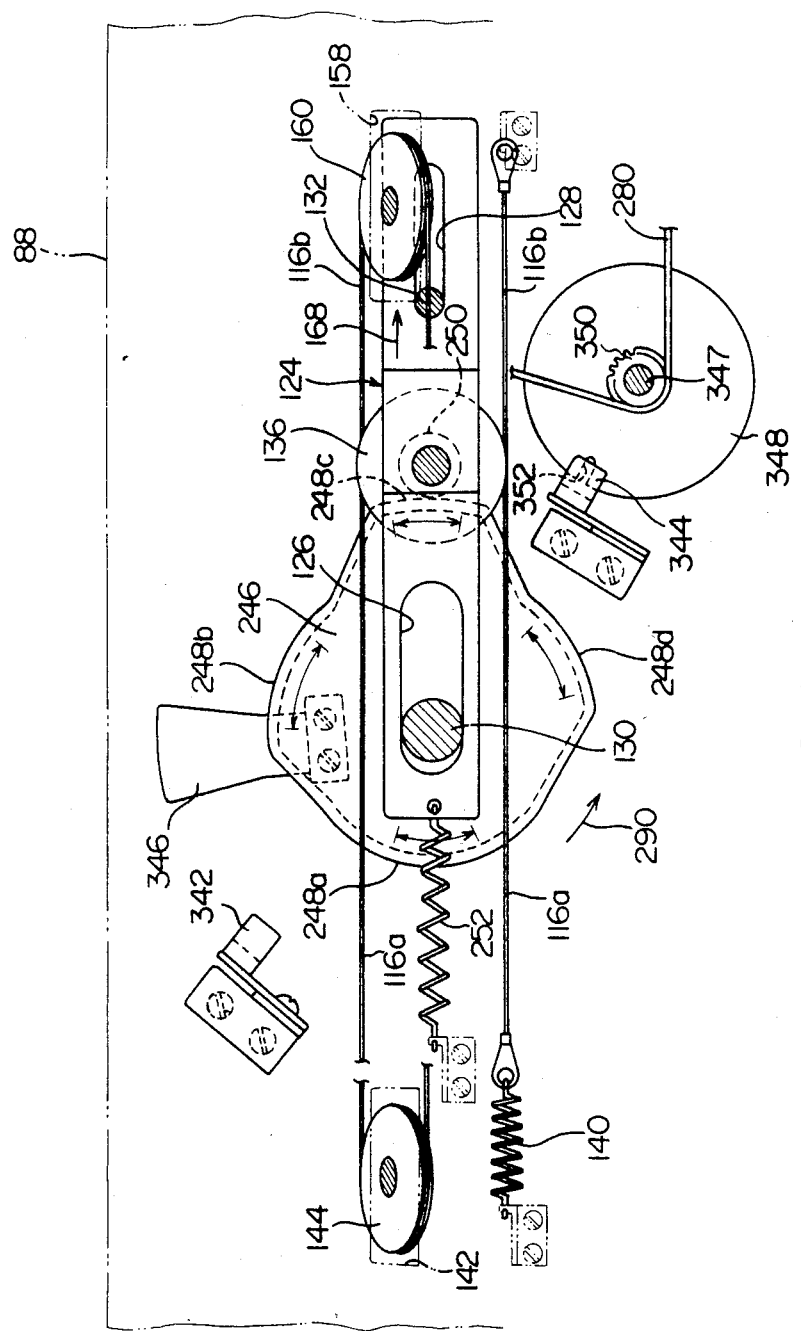
FIG. 9-B

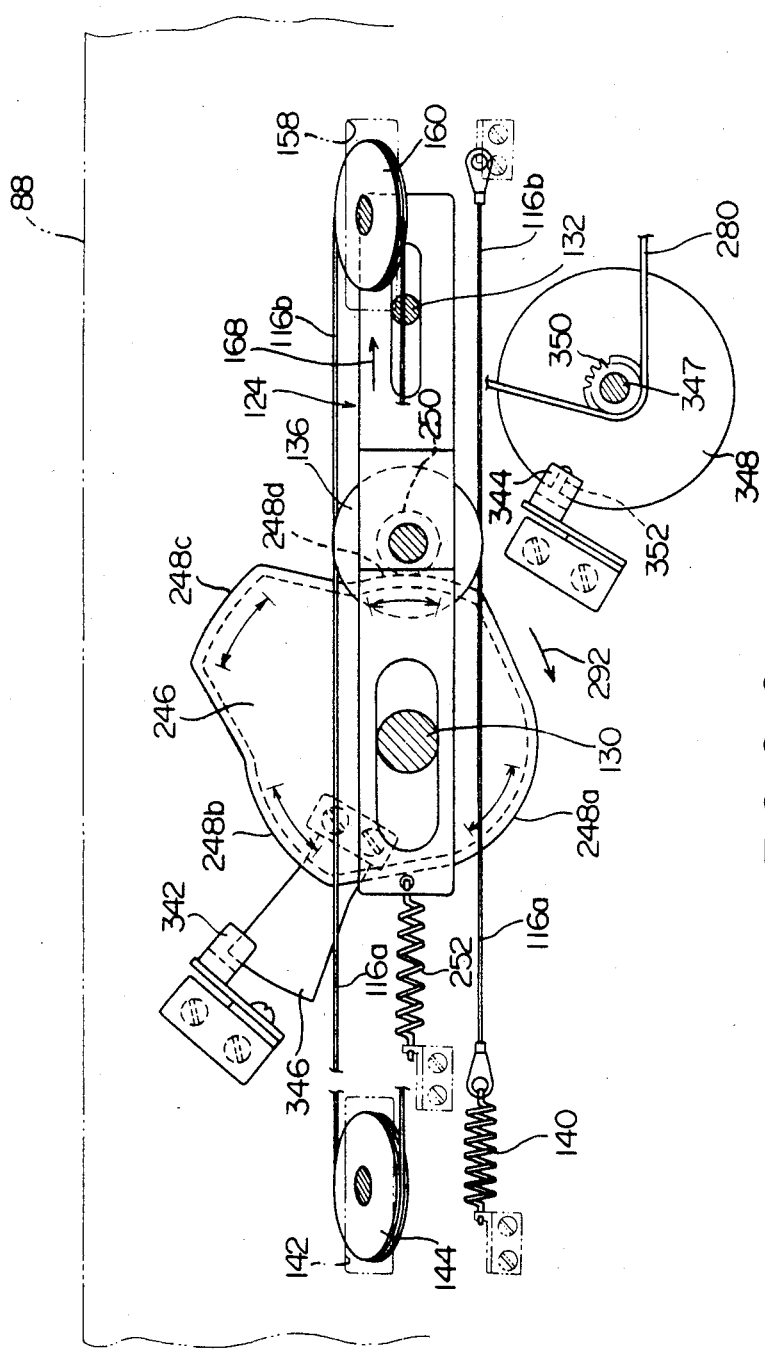
FIG. 9-C

VARIABLE MAGNIFICATION ELECTROSTATIC COPYING APPARATUS

FIELD OF THE INVENTION

This invention relates to a variable magnification electrostatic copying apparatus capable of producing copies at any of a plurality of magnifications.

DESCRIPTION OF THE PRIOR ART

Variable magnification electrostatic copying apparatuses capable of producing copies of a document at a desired magnification selected from a plurality of magnifications, for example, a 1:1 ratio or a reduced or enlarged ratio, have been proposed and have received commercial acceptance.

Such a variable magnification electrostatic copying apparatus generally has an optical system capable of projecting the image of a document placed on a transparent plate at a selected projecting ratio onto an electrostatographic material in an exposure zone along the moving path of the electrostatographic material. The copying magnification can generally be varied by changing the projecting ratio of the optical system and the speed of scanning exposure which is carried out by moving at least a part of the optical system and the transparent plate relative to each other. The projecting ratio of the optical system can be changed by changing the position of at least one optical element assembly of the optical system. When the optical system is of the type which includes a first reflecting mirror assembly, a second reflecting mirror assembly and a lens assembly and in which at the time of scanning, the first reflecting mirror assembly is moved along the stationary transparent plate and in synchronism with the movement of the first reflecting mirror assembly, the second reflecting mirror assembly is moved at a speed one-half of that of the first reflecting mirror assembly, the projecting ratio of the optical system can be changed by changing the position of the lens assembly and the position of the second reflecting mirror assembly with respect to the first reflecting mirror assembly.

However, the conventional variable magnification electrostatic copying apparatuses have problems or defects which have to be overcome. For example, (a) means for changing the projecting ratio of the optical system by moving the lens assembly and the second reflecting mirror assembly is relatively complex and expensive; and (b) it is difficult to maintain accurately and stably the lens assembly and the second reflecting mirror assembly at the required positions.

Furthermore, conventional variable magnification electrostatic copying apparatuses of other types (for example those having a different type of optical system from that described above although the optical system is moved at the time of scanning exposure, or those of the type in which the transparent plate is moved at the time of scanning exposure), not restricted to those having the aforesaid type of optical system, have the following problems or defects.

(c) The amount of exposure on the electrostatographic material which varies when the copying magnification is changed is corrected by providing an exposure correcting plate. Means for moving the exposure correcting plate and correcting the amount of exposure is complex and expensive. Moreover, it is difficult to set accurately and stably the exposure correcting plate at the required position.

(d) At the time of changing the copying magnification, at least one optical element assembly of the optical system is moved. A controlling means for setting the optical element assembly at the required position is complex.

(e) At the time of changing the copying magnification, at least one optical element assembly of the optical system is moved. Means for detecting the location of the optical element assembly at the required position is complex and expensive.

SUMMARY OF THE INVENTION

It is a first object of this invention to provide an improved variable magnification electrostatic copying apparatus equipped with an optical system of the above-described type, which has a fully reliable and yet simple and inexpensive means for changing the projecting ratio of the optical system by moving a lens assembly and a second reflecting mirror assembly in the required manner.

It is a second object of this invention to provide an improved variable magnification electrostatic copying apparatus which has a fully reliable and yet relatively simple and inexpensive means for correcting the amount of exposure on an electrostatographic material by moving an exposure correcting plate.

A third object of this invention is to provide an improved variable magnification electrostatic copying apparatus which has a simple control means for holding an optical element assembly of an optical system at the required position.

A fourth object of this invention is to provide an improved variable magnification electrostatic copying apparatus which has a relatively simple and inexpensive means for accurately detecting the location of an optical element assembly at the required position Other objects and advantages of this invention will become apparent from the following description.

According to a first aspect of this invention, there is provided a variable magnification electrostatic copying apparatus comprising a stationary transparent plate for placing thereon a document to be copied, an optical system for projecting an image of the document onto an electrostatographic material at a desired projecting ratio selected from a plurality of projecting ratios in an exposure zone along the moving path of the electrostatographic material, said optical system including a first reflecting mirror assembly to be moved reciprocally along the transparent plate, a second reflecting mirror assembly to be moved reciprocally at a speed equal to one-half of the moving speed of the first reflecting mirror assembly in synchronism with the reciprocal movement of the first reflecting mirror assembly and substantially parallel to the reciprocating direction of the first reflecting mirror assembly, and a lens assembly to be held at any of a plurality of positions corresponding to the plurality of projecting ratios, the projecting ratio being changed by changing the position of the lens assembly and the position of the second reflecting mirror assembly relative to the first reflecting mirror assembly in the reciprocating direction of the second reflecting mirror assembly, a driving means for moving the first reflecting mirror assembly and the second reflecting mirror assembly reciprocally, and a projecting ratio changing means for moving the lens assembly and the second reflecting mirror assembly so as to change the projecting ratio of the optical system; wherein said projecting ratio changing means includes a drive source for changing the projecting ratio, a control means for controlling the operation of said drive source, a setting member adapted to be held at any of a plurality of positions corresponding to the plurality of projecting ratios for moving the second reflecting mirror assembly, a first power transmission system interposed between the drive source and the setting member, and a second power transmission system, said first power transmission system including a cam drivingly connected to the drive source and a cam follower mounted on the setting member and cooperatively acting with the cam, and the second power transmission system including a wrapped power transmission mechanism disposed between the drive source and the lens assembly, and wherein when the drive source is operated, the second reflecting mirror assembly is moved through the first power transmission system and the setting member, and the lens assembly is moved through the second power transmission system.

According to a second aspect of this invention, there is provided a variable magnification electrostatic copying apparatus comprising a transparent plate for placing thereon a document to be copied, an optical system for projecting an image of the document on an electrostatographic material at any desired projecting ratio selected from a plurality of projecting ratios in an exposure zone along the moving path of the electrostatographic material, said optical system including at least one optical element assembly adapted to be held at any one of a plurality of positions corresponding to the plurality of projecting ratios and remaining held at said position during the performance of said projection, and a projecting ratio changing means for moving said optical element assembly so as to change the projecting ratio of the optical system; wherein said optical system further includes at least one exposure correcting plate mounted for free movement between an operating position at which it projects into a light path ranging from the document to the electrostatographic material and a non-operating position at which it deviates from the light path, spring means for elastically biasing the exposure correcting plate to one of the operating and non-operating positions, and moving means for moving the exposure correcting plate to the other of the operating and non-operating positions against the elastic biasing action of the spring means according to the position of the optical element assembly to be held at any one of the plurality of positions corresponding to the plurality of projecting ratios.

According to a third aspect of this invention, there is provided a variable magnification electrostatic copying apparatus comprising a transparent plate for placing theron a document to be copied, an optical system for projecting an image of the document onto an electrostatographic material at any desired projecting ratio selected from a plurality of projecting ratios in an exposure zone along the moving path of the electrostatographic material, said optical system including at least one optical element assembly to be held at any one of a plurality of positions corresponding to the plurality of projecting ratios, and a projecting ratio changing means for moving the optical element assembly so as to change the projecting ratio of the optical system; wherein said projecting ratio changing means includes a stepping motor to be driven by supplying a pulse current, a power transmission system interposed between the stepping motor and the optical element assembly, a detecting means for detecting the optical element assembly when said optical element assembly is at a specified position, and a control means for controlling the supply of a pulse current to the stepping motor on the basis of said specified position of the optical element assembly.

According to a fourth aspect of this invention, there is provided a variable magnification electrostatic copying apparatus comprising a transparent plate for placing thereon a document to be copied, an optical system for projecting an image of the document at any desired projecting ratio selected from a plurality of projecting ratios, said optical system including at least one optical element assembly to be held at any one of a plurality of positions corresponding to the plurality of projecting ratios, and a means for moving the optical element assembly so as to change the projecting ratio of the optical system; wherein said projecting ratio changing means includes a drive source for changing the projecting ratio, a power transmission system interposed between said drive source and the optical element assembly, a detecting means for detecting the optical element assembly when the optical element assembly is at a specified position, and a control means for controlling the operation of said drive source according to an output signal of the detecting means; said detecting means includes a low-speed rotating plate drivingly connected to said drive source, a high-speed rotating plate drivingly connected to said drive source, a first detector for detecting the low-speed rotating plate when said plate is at a predetermined angular position, and a second detector for detecting the high-speed rotating plate when said plate is at a predetermined angular position; and while the optical element assembly is moved from said specified position existing at one extremity of the plurality of positions to a position existing at the other extremity, the low-speed rotating plate is rotated through not more than one turn and the high-speed rotating plate is rotated through a plurality of turns, and when the optical element assembly reaches said specified position, the low-speed rotating plate is at the predetermined angular position and is detected by the first detector and the high-speed rotating plate is at the predetermined angular position and is detected by the second detector.

BRIEF DESCRIPTION OF THE DRAWINGS

FIGS. 9-A to 9-C are partial front elevations, partly omitted, illustrating the state of a second power transmission system when a lens assembly and a second reflecting mirror assembly are held at a first reduced ratio position, a second reduced ratio position and an enlarged position, respectively;

OUTLINE OF THE ENTIRE COPYING APPARATUS

Figure 1:
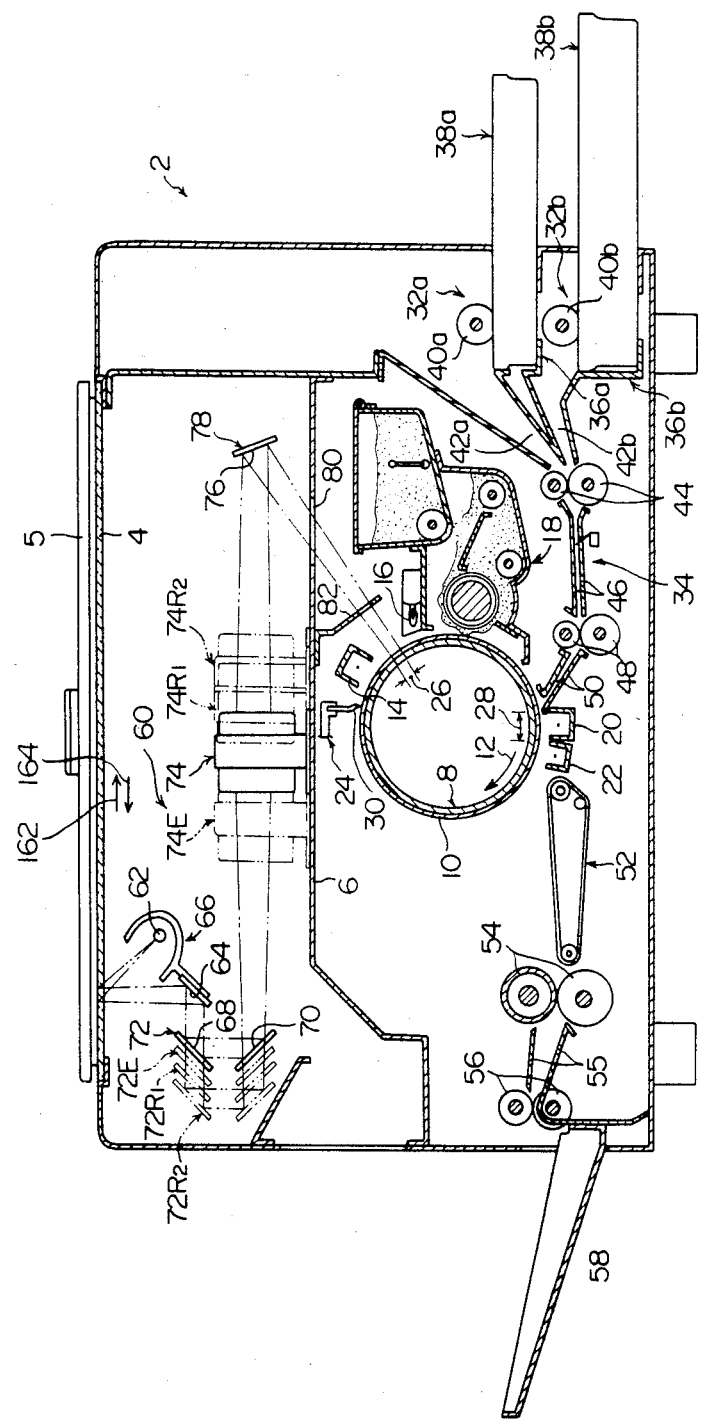
FIG. 1 is a simplified sectional view showing one specific embodiment in its entirety of the variable magnification electrostatic copying apparatus constructed in accordance with this invention.

The general structure of the variable magnification electrostatic copying apparatus of this invention is described with reference to FIG. 1 which is a simplified sectional view showing one specific embodiment of the copying apparatus of this invention.

The illustrated copying apparatus has a nearly rectangular parallelpipedal housing shown generally at 2. A stationary transparent plate 4 for placing thereon a document to be copied is fixed to the upper surface of the housing 2, and a document holder 5 which can be freely opened and closed for covering the transparent plate 4 and the document thereon is also provided on the upper surface of the housing 2.

Within the housing 2 is disposed a base plate 6 most of which extends substantially horizontally within the housing 2 to divide the inside of the housing 2 into an upper space and a lower space. A cylindrical rotating drum 8 is rotatably mounted nearly centrally at the lower space, and an electrostatographic material 10 is provided on at least a part of the peripheral surface of the rotating drum 8.

Around the rotating drum 8 to be rotated in the direction of an arrow 12 are disposed a charging corona discharge device 14, a charge eliminating lamp 16, a developing device 18, a transferring corona discharge device 20, a peeling corona discharge device 22 and a cleaning device 24 in this order in the rotating direction of the rotating drum 8. The charging corona discharge device 14 charges the electrostatographic material 10 substantially uniformly to a specified polarity. An exposure zone 26 exists between the charging corona discharge device 14 and the charge eliminating lamp 16. In the exposure zone 26, the image of the document placed on the transparent plate 4 is projected and a latent electrostatic image corresponding to the image of the document is formed on the electrostatographic material 10. The charge eliminating lamp 16, at the time of reduced scale copying, illuminates both side portions of the electrostatographic material 10 (i.e. both end portions thereof as viewed in the direction of the axis of rotation of the rotating drum 8) which have been charged by the charging corona discharge device 14 but to which the image of the document has not been projected in the exposure zone 26, to remove the charge therefrom. The developing device 18 applies toner particles to the latent electrostatic image on the electrostatographic material 10 to develop it to a toner image. The transferring corona discharge device 20 applies a corona discharge to the back of a copying paper contacted with the surface of the electrostatographic material 10 in a transfer zone 28 and thus transfers the toner image from the electrostatographic material 10 to the copying paper. The peeling corona discharge device 22 applies a corona discharge to the back of the copying paper immediately downstream of the transferring zone 28 to peel the electrostatically attracted copying paper from the surface of the electrostatographic material 10. The cleaning device 24 has a blade 30 made of an elastic material capable of being pressed against the surface of the electrostatographic material 10, and removes by the action of the blade 30 any residual toner particles remaining on the electrostatographic material 10 after the transfer operation. If desired, a charge eliminating lamp and a charge elemeinating corona discharge device (not shown) for removing a charge which may remain on the electrostatographic material 10 after the transfer operation can be additionally provided in an area between the peeling corona discharge device 22 and the cleaning device 24 as viewed in the rotating direction of the rotating drum 8 shown by the arrow 12.

In the lower space of the housing 2 are disposed two copying paper feed machanisms 32a and 32b laid side by side in the vertical direction and a copying paper conveying mechanism shown generally at 34 for conveying a copying paper fed from the paper feed mechanisms 32a and 32b through the transfer zone 28. The copying paper feed mechanisms 32a and 32b, respectively, have cassette-receiving sections 36a and 36b, copying paper cassettes 38a and 38b to be mounted detachably on the cassette-receiving sections 36a and 36b through an opening formed on the right side wall of the housing 2, and supply rollers 40a and 40b. One of the supply rollers 40a and 40b is selectively actuated to supply copying papers one by one to the copying paper conveying mechanism 34 through a supply passage 42a or 42b from a stack of a plurality of copying paper sheets accommodated in the cassette 38a or 38b. The copying paper conveying mechanism 34 includes a pair of carrying rollers 44 for carrying the copying paper supplied through the supply passage 42a or 42b, a pair of guide plates 46, a pair of conveying rollers 48, a pair of guide plates 50 for conducting the copying paper from the pair of conveying rollers 48 to the transfer zone 28, a conveyor belt assembly 52 for conveying the copying paper peeled from the electrostatographic material 10, a pair of fixing rollers 54, a pair of guide plates 55, a pair of delivery rollers 56 and a receiving tray 58 for receiving the copying paper discharged from the delivery rollers 56 through an opening formed on the left side wall of the housing 2. The upper roller of the pair of fixing rollers 54 is provided with an internal heating element (not shown) and heats as well as presses the surface of the copying paper having a toner image transferred from the electrostatographic material 10, thus fixing the toner image to the copying paper.

Within the upper space of the housing 2 above the base plate 6 is provided an optical system shown generally at 60 for projecting the image of the ducument on the transparent plate 4 onto the electrostatographic material 10 in the exposure zone 26. The optical system 60 is comprised of a first reflecting mirror assembly 66 having a document illuminating lamp 62 and a reflecting mirror 64, a second reflecting mirror assembly 72 having two reflecting mirrors 68 and 70, a lens assembly 74 having at least one lens, and a third reflecting mirror assembly 78 having a reflecting mirror 76. As will be stated in detail hereinbelow, the first reflecting mirror assembly 66 is moved reciprocally along the transparent plate 4 in the right-left direction in FIG. 1. The second reflecting mirror assembly 72 is moved reciprocally in synchronism with the reciprocal movement of the first reflecting mirror assembly 66 substantially parallel to the reciprocal movement of the first reflecting mirror assembly 66 in the left-right direction in FIG. 1, but at a speed one-half of the moving speed of the first reflecting mirror assembly 66. When the first reflecting mirror 66 and the second reflecting mirror 72 advance from left to right in FIG. 1, the document placed on the transparent plate 4 is scanned, and the image of the document is projected onto the electrostatographic material 10 in the exposure zone 26. The reflected light from the document illuminated by the document illuminating lamp 62 is reflected by the reflecting mirrors 64, 68 and 70, goes through the lens of the lens assembly 74, then is reflected by the reflecting mirror 76, and arrives at the electrostatographic material 10 in the exposure zone 26 past an opening 80 formed in the base plate 6. Between the opening 80 and the electrostatographic material 10 is disposed a slit exposure width regulating member 82 for regulating the slit exposure width which is the width of the light path leading to the electrostatographic material 10 in the moving direction of the electrostatographic material 10 (i.e., the rotating direction of the rotating drum 8 shown by the arrow 12).

The illustrated copying apparatus is constructed such that it can produce copies at a copying magnification selected from four copying magnifications, for example a ratio of 1:1, a first reduced scale copying at a length ratio of about 0.82 and an area ratio of about 0.67 for example, a second reduced scale copying at a length ratio of about 0.7 and an area ratio of about 0.5 for example, and an enlarged scale copying at a length ratio of about 1.27 and an area ratio of about 1.6 for example.

As will be described in detail, when copying is carried out at a ratio of 1:1, the lens assembly 74 of the optical system 60 is held at the position shown by solid lines in FIG. 1, and at the start of movement, the second reflecting mirror assembly 72 is held at the position shown by solid lines in FIG. 1. Thus, the optical system 60 is in condition for projecting the image of a document at 1:1 onto the electrostatographic material 10. When the image of the document is projected onto the electrostatographic material 10, the first reflecting mirror assembly 66 is moved at a speed V substantially equal to the moving speed of the electrostatographic material 10, and the second reflecting mirror assembly 72, at a speed of $\frac{1}{2}V$.

In the case of the first reduced scale copying, the lens assembly 74 of the optical system 60 is held at a first reduced ratio position shown by two-dot chain lines 74R$_1$ in FIG. 1, and the second reflecting mirror assembly 72, at the start of movement, is held at a first reduced ratio position shown by two-dot chain lines 72R$_1$ in FIG. 1. As a result, the optical system 60 is in condition for projecting the image of a document at about 0.82:1 onto the electrostatographic material 10 (whereby the widthwise size of a latent electrostatic image formed on the electrostatographic material 10 is reduced to about 0.82 times). When the image of the document is projected onto the electrostatographic material 10, the first reflecting mirror assembly 66 is moved at a speed of about V/0.82 and the second reflecting mirror assembly 72, at a speed of $$\frac{V}{2 \times 0.82}$$

(whereby the size of a latent electrostatic image formed on the electrostatographic material 10 in the moving direction of the electrostatographic material 10, i.e. the scanning-exposure moving direction, is reduced to about 0.82 times).

In the case of the second reduced scale copying, the lens assembly 74 of the optical system 60 is held at a second reduced ratio position shown by two-dot chain lines 74R$_2$ in FIG. 1, and at the start of movement, the second reflecting mirror assembly 72 is held at a second reduced ratio position shown by two-dot chain lines 72R$_2$ in FIG. 1. As a result, the optical system 60 is in condition for projecting the image of a document at about 0.7:1 onto the electrostatographic material 10 (whereby the widthwise size of a latent electrostatic image formed on the electrostatographic material 10 is reduced to about 0.7 times). When the image of a document is to be projected onto the electrostatographic material 10, the first reflecting mirror assembly 66 is moved at a speed of about V/0.7, and the second reflecting mirror assembly 72, at a speed of about $$\frac{V}{2 \times 0.7}$$

(whereby the size of a latent electrostatic image formed on the electrostatographic material 10 in the moving direction of the electrostatographic material 10, i.e., the scanning-exposure moving direction, is reduced to about 0.7 times).

In the case of the enlarged scale copying, the lens assembly 74 of the optical system 60 is held at an enlarged ratio position shown by two-dot chain lines 74E in FIG. 1, and the second reflecting mirror assembly 72, at the start of movement, is held at an enlarged ratio position shown by two-dot chain lines 72E in FIG. 1. As a result, the optical system 60 is in condition for projecting the image of a document at about 1.27:1 onto the electrostatographic material 10 (whereby the widthwise size of a latent electrostatic image formed on the electrostatographic material 10 is enlarged to about 1.27 times). When the image of the document is to be projected onto the electrostatographic material 10, the first reflecting mirror assembly 66 is moved at a speed of about V/1.27, and the second reflecting mirror assembly 72, at a speed of about $$\frac{V}{2 \times 1.27}$$

(whereby the size of a latent electrostatic image formed on the electrostatographic material 10 in the moving direction of the electrostatographic material 10, i.e. the scanning-exposure direction, is enlarged to about 1.27 times).

In the meantime, irrespective of the copying magnification, the rotating drum 8 is always rotated at a predetermined speed, and the electrostatographic material 10 is always moved at a speed of V. The copying paper conveying mechanism 34 conveys the copying paper through the transfer zone 28 always at a predetermined speed, i.e. the same speed as the moving speed of the electrostatographic material 10, irrespective of the copying magnification.

The aforesaid structure of the variable magnification electrostatic copying apparatus shown in FIG. 1 is already known, and shows only one example of variably magnification electrostatic copying apparatuses to which the present invention is applicable.

In the illustrated variable magnification electrostatic copying apparatus, the improvement to be described below in detail is attached to the optical system 60 in accordance with this invention.

First and second reflecting mirror assemblies

Figure 2:
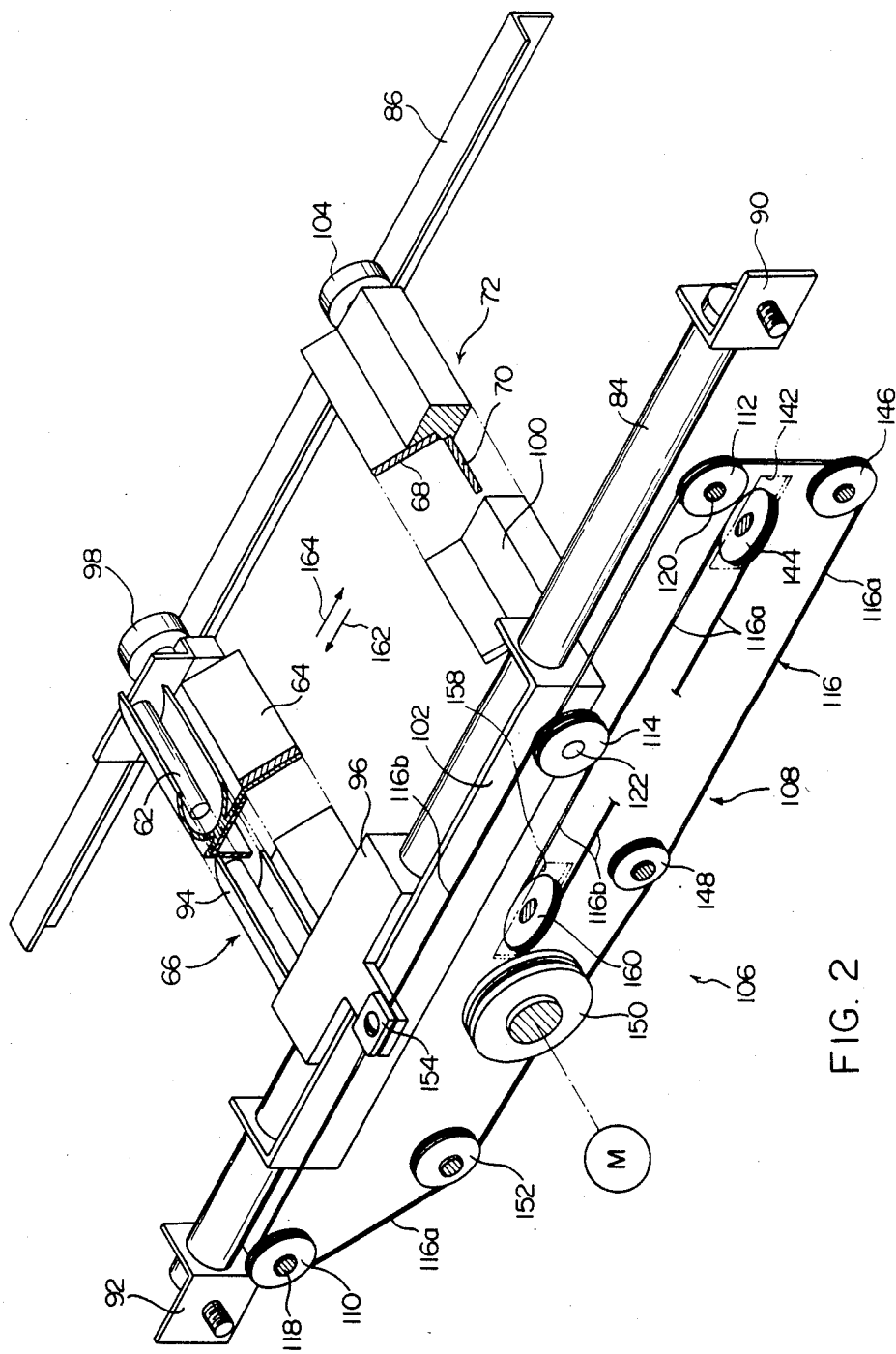
FIG. 2 is a partial perspective view showing a first and a second reflecting mirror assemblies in an optical system in the variable magnification electrostatic copying apparatus of FIG. 1.
Figure 3:
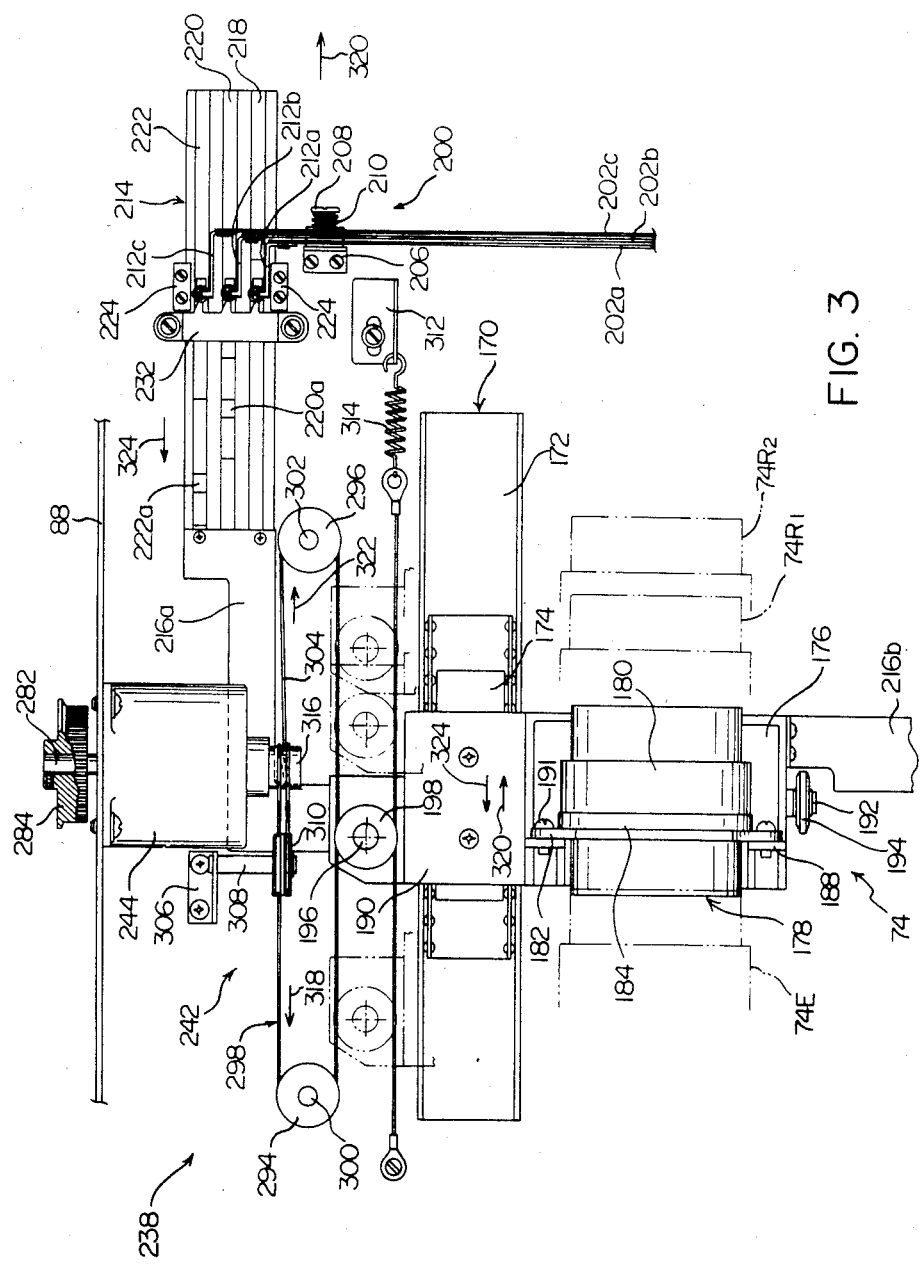
FIG. 3 is a partial top plan view showing a lens assembly and a second power transmission system of a projecting ratio changing means in the variable magnification electrostatic copying apparatus shown in FIG. 1.
Figure 8:
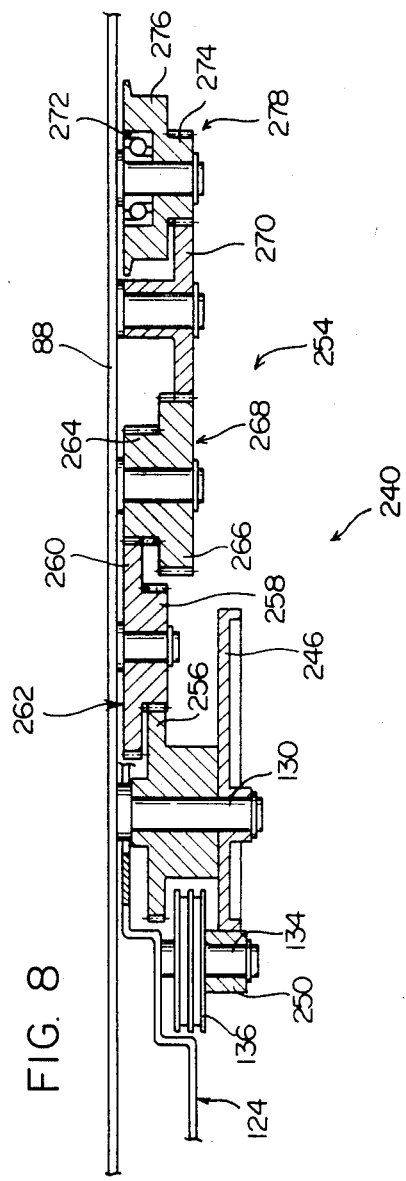
FIG. 8 is a sectional view taken along line VIII—VIII of FIG. 7.
Figure 7:
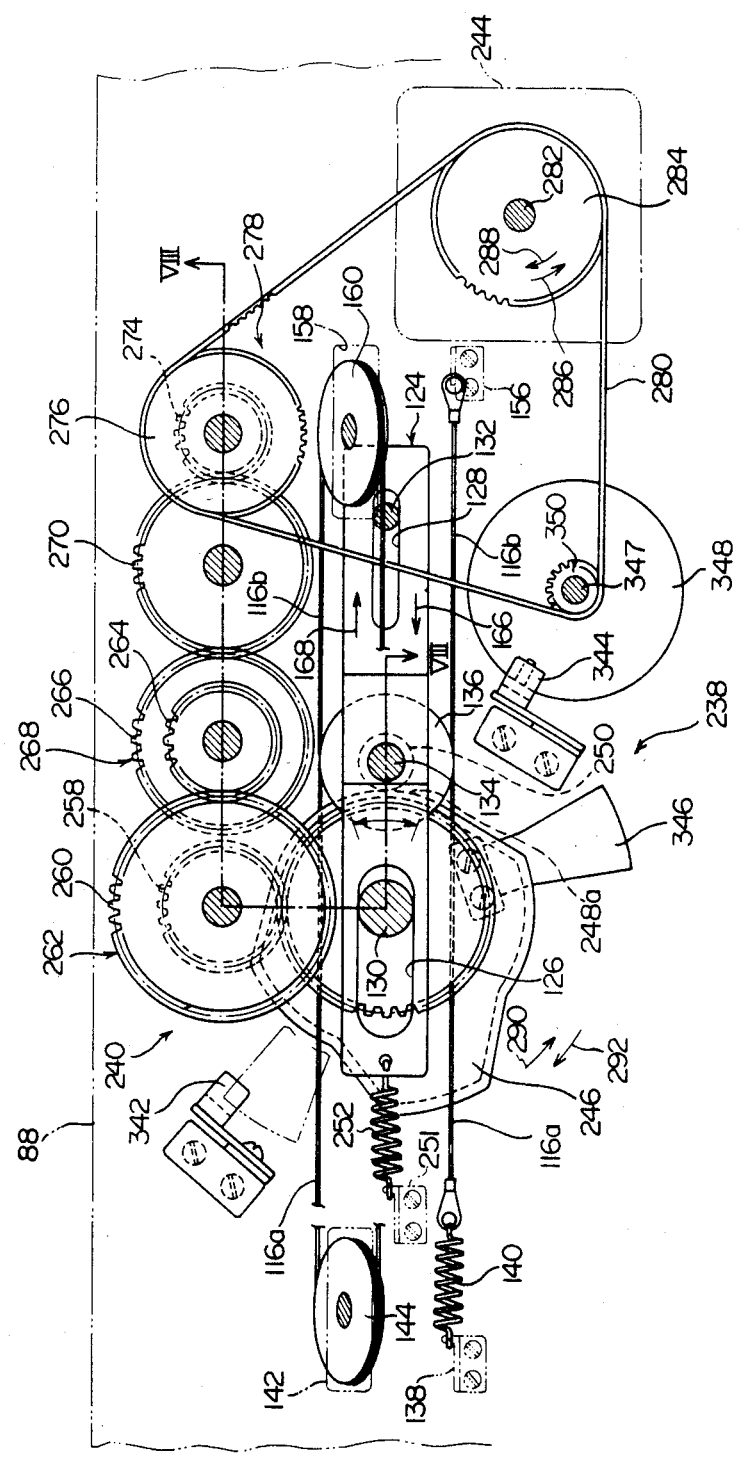
FIG. 7 is a partial front elevation showing a first power transmission system in a projecting ratio changing means in the variable magnification electrostatic copying apparatus of FIG. 1.

The state in which the first reflecting mirror assembly 66 and the second reflecting mirror assembly 72 have been moved a considerable distance from a start position is described below with reference to FIG. 2 which is a perspective view seen from the side of the start position (i.e., from the left-hand side in FIG. 1), A suspending rod 84 and a guide rail 86 spaced from each other a predetermined distance and extending substantially parallel to each other are disposed in the upper space of the housing 2 above the base plate 6 (see FIG. 1). The suspending rod 84 is mounted across a pair of securing brackets 90 and 92 fixed to the inside surface of a rear vertical side plate 88 (that vertical side plate of a pair of vertical side plates disposed at a predetermined distance from each other within the housing 2 and which is located rearwardly, and is shown in FIGS. 3, 7 and 8) at a predetermined distance therebetween in the reciprocating direction (the left-right direction in FIG. 1) of the first reflecting mirror assembly 66 and the second reflecting mirror assembly 72. The guide rail 86 is fixed to a front vertical side plate (that vertical side plate of the pair of vertical side plates disposed at a predetermined distance therebetween within the housing 2 and which is located frontwardly).

The first reflecting mirror assembly 66 has a first supporting frame 94 with a reflecting portion, and the document illuminating lamp 62 and the reflecting mirror 64 are mounted on the first supporting frame 94 in the required manner. A sliding block 96 is fixed to one end of the first supporting frame 94 and also is mounted slidably on the suspending rod 84. A roller 98 is rotatably mounted on the other end of the first supporting frame 94 and also is placed on the guide rail 86. Thus, the first reflecting mirror assembly 66 including the document illuminating lamp 62 and the reflecting mirror 64 and the first supporting frame 94 are mounted slidably along the suspending rod 84 and the guide rail 86.

The second reflecting mirror assembly 72 has a second supporting frame 100 on which the reflecting mirror 68 and the reflecting mirror 70 are mounted in the required manner. To one end of the second supporting frame 100 is fixed a nearly ⊐-shaped sliding member 102, and two opposite end portions of the sliding member 102 which are located on opposite ends of the sliding block 96 are slidably mounted on the suspending rod 84. To the other end of the second supporting frame 100 is rotatably mounted a roller 104 which is in turn placed on the guide rail 86. Thus, the second reflecting mirror assembly 72 having the reflecting mirrors 68 and 70 is mounted slidably along the suspending rod 84 and the guide rail 86.

The first reflecting mirror assembly 66 and the second reflecting mirror assembly 72 are moved reciprocally by a driving means shown generally at 106. The driving means 106 includes a driving motor M and a retarding-interlocking mechanism 108 for moving the second reflecting mirror assembly 72 at a speed one-half of the moving speed of the first reflecting mirror assembly 66 in interlocking relation to the reciprocal movement of the first reflecting mirror assembly 66. The illustrated retarding-interlocking mechanism 108 comprises a pair of stationary pulleys 110 and 112, a moving pulley 114 and a rope or cable 116 wrapped about pulleys 110, 112 and 114. The pair of stationary pulleys 110 and 112 are rotatably mounted on supporting shafts 118 and 120 firmly mounted on the inner surface of the rear vertical side plate 88 (see FIGS. 3, 7 and 8) at a predetermined distance therebetween in the reciprocating direction of the first reflecting mirror assembly 66 and the second reflecting mirror assembly 72. On the other hand, the moving pulley 114 is mounted rotatably on a supporting shaft 122 firmly mounted on the sliding member 102 fixed to one end of the second reflecting mirror assembly 72. In the illustrated embodiment, in relation to the retarding-interlocking mechanism 108 including the pair of stationary pulleys 110 and 112, the moving pulley 114 and the rope 116, a slender setting member 124 (see FIG. 7) is disposed which extends in the reciprocating direction of the first reflecting mirror assembly 66 and the second reflecting mirror assembly 72. With reference also to FIG. 7 viewed from inside the housing 2, slots 126 and 128 extending in the aforesaid reciprocating direction are formed in the opposite end portions of the setting member 124, and supporting shafts 130 and 132 mounted firmly on the outside surface of the rear verical side plate 88 are received respectively in the slots 126 and 128. Thus, the setting member 124 is mounted movably in the aforesaid reciprocating direction. As will be stated below in detail, the setting member 124 is selectively held at any one of the four different positions corresponding to a selected copying magnification. A supporting shaft 134 is firmly mounted on the setting member 124, and a power transmission pulley 136 is rotatably mounted on the support shaft 134. The rope 116 has a portion 116a and a portion 116b. The portion 116a extends from its one end fixed through a spring member 140 to a mounting member 138 fixed to the outside surface of the rear vertical side plate 88 toward the power transmission pulley 136 and is wrapped about the pulley 136, then extends toward an inclined pulley 144 extending through an opening 142 formed in the rear vertical side plate 88 in an inclined and rotatable manner and is wrapped on the inclined pulley 144, then extends toward the moving pulley 114 mounted on the sliding member 102 of the second reflecting mirror assembly 72 and is wrapped about the moving pulley 114, further extends toward the stationary pulley 112 and is wrapped therearound, then extends toward guide pulleys 146 and 148 rotatably mounted on the inside surface of the rear vertical side plate 88 and is wrapped therearound, then extends toward a drive pulley 150 drivingly connected to the electric motor M and is wrapped therearound through several turns, further extends toward a guide pulley 152 mounted rotatably on the inside surface of the rear vertical side plate 88 and is wrapped therearound, further extends toward the stationary pulley 110 and is wrapped therearound, and further extends to a fixed portion 154 of the sliding block 96 of the first reflecting mirror assembly 66 and is fixed thereto. The portion 116b of the rope 116 extends from one end thereof fixed to a mounting member 156 fixed to the outside surface of the rear vertical side plate 88 toward the power transmission pulley 136 and is wrapped therearound in a direction opposite to the aforesaid wrapping direction of the portion 116a of the rope 116 on the power transmission pulley 136, then extends toward an inclined pulley 160 (forming the other of a pair of stationary guide pulleys) extending through an opening 158 formed in the rear vertical side plate 88 in an inclined and rotatable manner therearound and is wrapped about it, further extends toward the moving pulley 114 and is wrapped therearound in a direction opposite to the aforesaid wrapping direction of the portion 116a of the rope 116 on the moving pulley 114, further extends to the fixing portion 154 of the sliding block 96 of the first reflecting mirror assembly 66 and is fixed thereto, and continues to the portion 116a.

It will be readily seen that by the presence of the retarding-interlocking mechanism 108, when the first reflecting mirror assembly 66 is moved in the direction of an arrow 162, the second reflecting mirror assembly 72, in interlocking relation to the movement of the first reflecting mirror assembly 66, is moved in the direction of the arrow 162 at a moving speed one-half of the moving speed of the reflecting mirror assembly 66. Likewise, when the first reflecting mirror assembly 66 is moved in a direction shown by an arrow 164, the second reflecting mirror assembly 72, in interlocking relation with the movement of the first reflecting mirror assembly 66, is moved in the direction of the arrow 164 at a moving speed one-half of the moving speed of the first reflecting mirror assembly 66.

Furthermore, the following fact should be borne in mind with regard to the driving means 106 and the setting member 124. When the setting member 124 is moved in the direction of an arrow 166 in FIG. 7 while the driving of the first reflecting mirror assembly 66 is stopped, the power transmission pulley 136 moves as a unit with the setting member 124 while rotating counterclockwise in FIG. 7 in response to the movement of the setting member 124 in the direction of the arrow 166, because the movement of the first reflecting mirror assembly 66 is hampered by the driving connection of the fixing portion 154 to the driving pulley 150 through the rope 116. As a result, the moving pulley 114 moves in the direction of arrow 162 while rotating clockwise as viewed from the left bottom in FIG. 2, and the second reflecting mirror assembly 72 is moved in the direction of arrow 162 relative to the first reflecting mirror assembly 66 by the same distance as the moving distance of the setting member 124 in response to the movement of the setting member 124 in the direction of arrow 166. Likewise, when the setting member 124 is moved in the direction of an arrow 168 in FIG. 7 in the manner to be described in detail hereinafter while the driving of the first reflecting mirror assembly 66 is stopped, the power transmission pulley 136 moves as a unit with the setting member 124 while rotating clockwise in FIG. 7 according to the movement of the setting member 124 in the direction of the arrow 168. As a result, the moving pulley 114 moves in the direction of arrow 164 while rotating counterclockwise as viewed from the left bottom in FIG. 2, and the second reflecting mirror assembly 72 is moved in the direction of arrow 164 relative to the first reflecting mirror assembly 66 by the same distance as the moving distance of the setting member 124 in response to the movement of the setting member 124 in the direction of arrow 168. The above movement of the second reflecting mirror assembly 72 according to the movement of the setting member 124 is utilized to change the position of the second reflecting mirror assembly 72 at the time of changing the projecting ratio of the optical system 60 (see FIG. 1) as will be described in detail hereinafter.

Lens assembly

Figure 4:
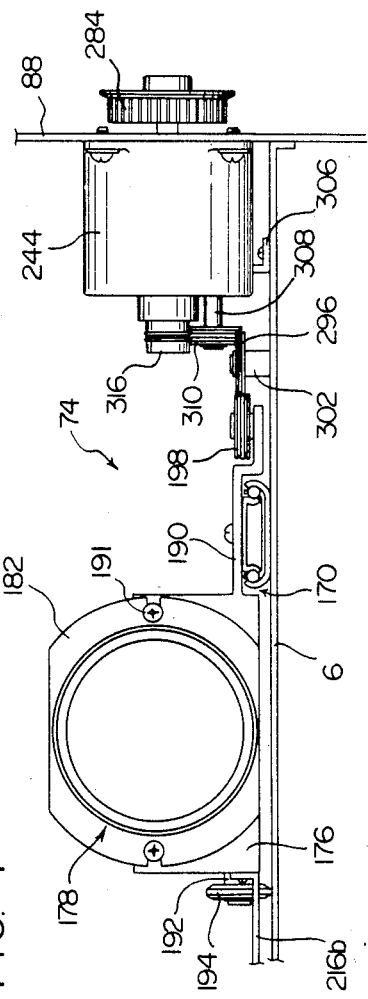
FIG. 4 is a partial side elevation of the lens assembly and the second power transmission system in FIG. 3.

Referring to FIGS. 3 and 4, a sliding guide member 170 (for example, sold under the tradename "ACCURIDE" by Japan Accuride Co., Ltd.) extending in the reciprocating direction (left-right direction in FIG. 1) of the first and second reflecting mirror assemblies 66 and 72 is mounted on the base plate 6 within the housing 2. The sliding guide member 170 has a base portion 172 and a sliding portion 174 mounted slidably on the base portion 172. The base portion 172 is fixed to the base plate 6.

The lens assembly 74 has a supporting block 176 and a lens member 178 having at least one lens is fixed to the supporting block 176. The lens member 178 has a cylindrical lens housing 180, and a linking sleeve 184 having a linking projection 182 is received about the lens housing 180. On the other hand, an upstanding wall 188 is provided in the supporting block 176, and by fixing the linking projection 182 of the linking sleeve 184 and the upstanding wall 188 by a setscrew 191, the lens member 178 is fixed to the supporting block 176 in the required manner. At one end portion of the supporting block 176 is formed a fixing protruding portion 190 which is fixed to the sliding portion 174 of the sliding guide member 170. A short shaft 192 is set firmly on the side surface of the other end of the supporting block 176, and a roller 194 is rotatably mounted on the short shaft 192. The roller 194 is kept in contact with the base plate 6 in the housing 2 (see FIG. 4). The lens assembly 74 is mounted slidably along the sliding guide member 170.

A short shaft 196 is set firmly on the upper surface of the end portion of the fixing protruding portion 190 of the supporting block 176, and a power transmission pulley 198 is rotatably mounted on the short shaft 196. The power transmission pulley 198 is moved in a manner to be described in detail hereinbelow, whereby the lens assembly 74 is moved along the sliding guide member 170 for changing the projecting ratio of the optical system 60 (FIG. 1).

Figure 5:
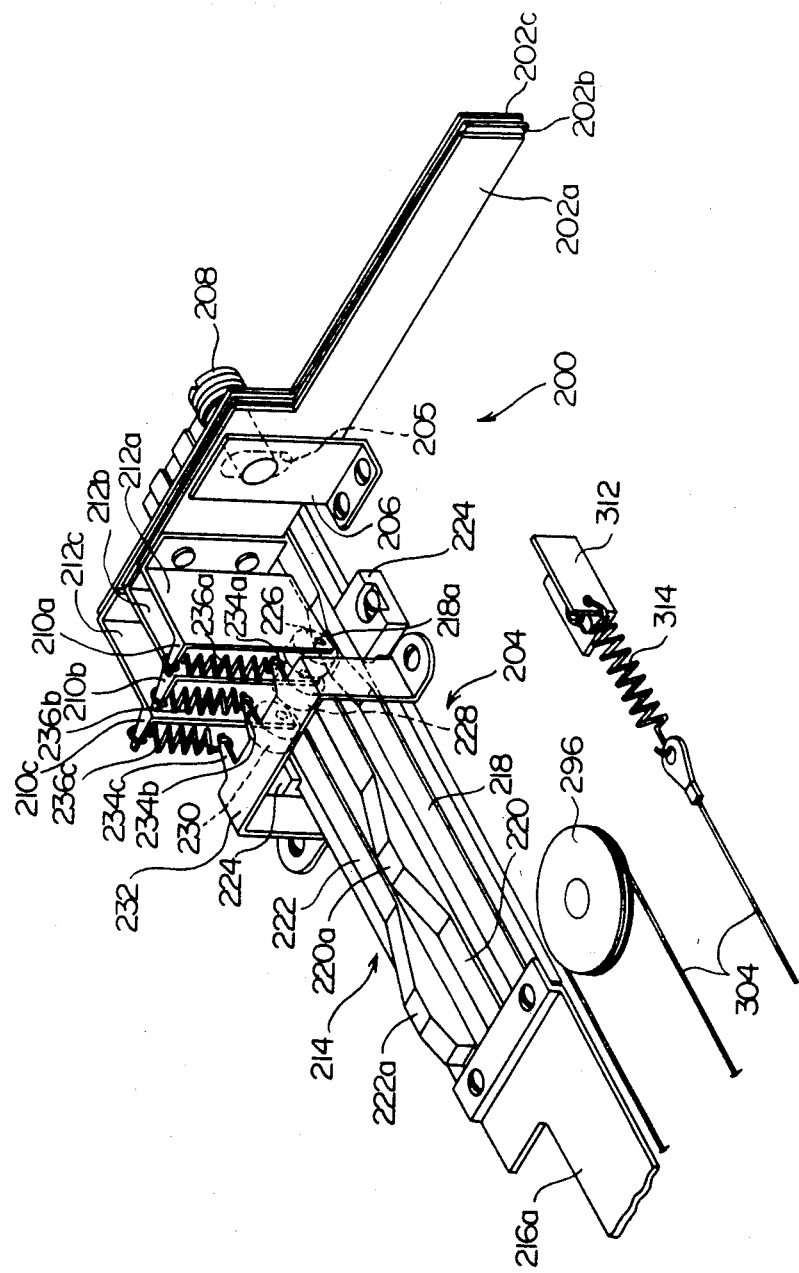
FIG. 5 is a partial perspective view showing a moving means in an exposure correcting means in the variable magnification electrostatic copying apparatus of FIG. 1.

In the illustrated embodiment, an exposure correcting means 200 for correcting the quantity of exposure on the electrostatographic material 10 is provided in relation to the lens assembly 74. Further, with reference to FIGS. 3, 5 and 6, the exposure correcting means 200 has a plurality of exposure correcting plates 202a, 202b and 202c and a moving means 204. Slots 205 (only one slot of the exposure correcting plate 202a is shown in FIG. 5) are formed on the opposite end portions of each of the exposure correcting plates 202a, 202b and 202c. The threaded portions of securing screws 208 screwed into brackets 206 (only the rear side bracket is shown in FIGS. 3 and 5) fixed to the opposite sides (sides perpendicular to the sheet surface in FIG. 1) of the upper surface of the base plate 6 are received in the slots 205 respectively. A spring member 210 is mounted between each of the heads of the securing screws 208 and the exposure correcting plate 202c. As a result, the exposure correcting plates 202a, 202b and 202c are mounted so that they are free to move along the slots 205 in the vertical direction in FIG. 1. Spacers are disposed on both sides of the exposure correcting plates 202a, 202b and 202c in order to make their relative movement smooth. Nearly L-shaped members 212a, 212b and 212c (only those on one side are shown in FIGS. 3 and 5) having protruding portions 210a, 210b and 210c formed, respectively, are fixed to the opposite ends of each of the exposure correcting plates 202a, 202b and 202c.

On the other hand, the moving member 204 includes cams 214 and cam followers cooperating with the respective cams 214. Nearly L-shaped linking members 216a and 216b (see FIG. 3) are fixed to the opposite sides of the supporting block 176, and to each of the linking members 216a and 216b (only one is shown in FIGS. 3 and 5) are fixed the cams 214. The cam 214 is constructed of a slender plate-like translation cam, on which a first cam surface 218, a second cam surface 220 and a third cam surface 222 extending in the moving direction of the first reflecting mirror assembly 66 and the second reflecting mirror assembly 72 are formed at predetermined intervals. On the first cam surface 218, the second cam surface 220 and the third cam surface 222 are respectively formed a first cam actuating surface 218a, a second cam actuating surface 220a and a third cam actuating surface 222a which project upwardly at different positions. A pair of guide members 224 for slidably guiding the cam 214 are further fixed to the upper surface of the base plate 6. Thus, when the supporting block 176 is moved, each of the cams 214 is guided by the guide members 224 and is moved accurately as a unit with the supporting block 176 in the moving direction of the first and second reflecting mirror assemblies 66 and 72.

On the other hand, the cam follower is constructed of follower rollers 226, 228 and 230 adapted to abut against the first cam surface 218, the second cam surface 220 and the third cam surface 222, and the follower rollers 226, 228 and 230 are respectively mounted rotatably on nearly L' shaped members 212a, 212b and 212c. Spring members 236a, 236b and 236c are mounted respectively between projecting portions 210a, 210b and 210c of the members 212a, 212b and 212c and projecting portions 234a, 234b and 234c formed on a nearly ⊐-shaped mounting member 232 fixed to the base plate 6. Hence, the follower rollers 226, 228 and 230 are respectively pressed elastically against the first cam surface 218, the second cam surface 220 and the third cam surface 222 by the elastic biasing actions of the spring members 236a, 236b and 236c.

In the exposure correcting means 200 described hereinabove, the exposure correcting plate 202a is usually held at a non-operating position outside of the light path of the optical system 60 (see FIG. 1) by the elastic biasing action of the spring member 236a. However, as will be stated in detail hereinafter, when the first cam actuating surface 218a of the first cam surface 218 is moved to a position at which it acts on the follower roller 226 (and hence, the lens assembly 74 is moved to a 1:1 position shown by solid lines in FIGS. 1 and 3), the exposure correcting plate 202a is moved upwardly against the force of the spring member 236a by the action of the first cam actuating surface 218a and is held at an operating position (shown by solid lines in FIG. 6) at which its end portion projects into the light path of the optical system 60. The exposure correcting plate 202b is usually held at a non-operating position outside of the light path of the optical system 60 by the elastic biasing action of the spring member 236b, but when as will be described in detail hereinbelow the second cam actuating surface 220a is moved to a position at which it acts on the follower roller 228 (and therefore, the lens assembly 74 is moved to a first reduced ratio position shown by the two-dot chain lines 74R$_1$ in FIGS. 1 and 3), the exposure correcting plate 202b is moved upwardly against the force of the spring member 236b by the action of the second cam actuating surface 220a as shown by the two-dot chain lines 220A in FIG. 6 and is held at an operating position (the position shown by two-dot chain lines 202B in FIG. 6) at which its end portion projects into the light path of the optical system 60. Furthermore, the exposure correcting plate 202c is usually held at a non-operating position outside of the light path of the optical system 60 by the elastic biasing action of the spring member 236c, but when as stated in detail hereinbelow, the actuating surface 222a of the third cam surface 222 is brought to a position at which it acts on the follower roller 230 (and therefore, the lens assembly 74 is moved to an enlarged ratio position shown by the two-dot chain lines 74R$_2$ in FIGS. 1 and 3), the exposure correcting plate 202c is moved upwardly against the force of the spring member 236c by the action of the third cam actuating surface 222a and is held at an operating position (the position shown by two-dot chain lines 202c in FIG. 6) at which its end portion projects into the light path of the optical system 60.

Means for changing the projecting ratio of the optical system

As stated above, the variable magnification electrostatic copying apparatus of the invention is constructed such that it can produce copies at any desired copying magnification selected from a 1:1 ratio, a first reduced ratio (for example, a length ratio of about 0.82 and an area ratio of about 0.67), a second reduced ratio (for example, a length ratio of about 0.7, and an area ratio of about 0.5), and an enlarged ratio (for example, a length ratio of about 1.27 and an area ratio of about 1.6). In the case of the 1:1 copying, the lens assembly 74 and the second reflecting mirror assembly 72 are held at the position shown by the solid lines in FIG. 1. In the case of the first reduced scale copying, the lens assembly 74 and the second reflecting mirror assembly 72 are held at the positions shown by the two dot chain lines 74R$_1$ and 72R$_1$ in FIG. 1. In the case of the second reduced scale copying, the lens assembly 74 and the second reflecting mirror assembly 72 are held at the positions shown by the two-dot chain lines 74R$_2$ and 72R$_2$ in FIG. 1. In the case of the enlarged copying, the lens assembly 74 and the second reflecting mirror assembly 72 are held at the positions shown by the two-dot chain lines 74E and 72E in FIG. 1. The above positioning of the lens assembly 74 and the second reflecting mirror assembly 72 is effected when the reciprocating movement of the first reflecting mirror assembly 66 and the second reflecting mirror assembly 72 is stopped and the second reflecting mirror assembly 72 is held at a movement start position. Hence, the aforesaid positions of the second mirror reflecting mirror assembly 72, i.e. the position shown by the solid line in FIG. 1 and the positions shown by the two-dot chain lines 72R$_1$, 72R$_2$ and 72E in FIG. 1, are movement start positions.

The variable magnification electrostatic copying apparatus constructed in accordance with this invention is provided with means 238 for changing the projecting ratio of the optical system (see FIGS. 3 and 7) which is adapted to hold the lens assembly 74 at any selected one of the four positions described above according to the selected copying magnification and the second reflecting mirror assembly 72 at any one of the four positions described above. The projecting ratio changing means 238 includes a drive source for changing the projecting ratio, a first power transmission system 240 and a second power transmission system 242. In the illustrated embodiment, the drive source for changing the projecting ratio is constructed of a stepping motor 244 to be driven by the supply of a pulse current, and the stepping motor 244 is fixed to the rear vertical side plate 88. The first power transmission system 240 (see FIG. 7) is disposed between the stepping motor 244 and the setting member 124 described hereinabove. The second power transmission system 242 (see FIG. 3) is disposed between the stepping motor 244 and the lens assembly 74.

First, with reference to FIGS. 7 and 8, the first power transmission system 240 will be described. The first power transmission system 240 includes a cam 246 rotatably mounted on the supporting shaft 130. The cam 246 is constructed of a rotating cam plate, and on its peripheral surface are formed a plurality of arcuate positioning surfaces having different radii, i.e. a 1:1 ratio position setting surface 248a, a first reduction ratio position setting surface 248b, a second reduced ratio position setting surface 248c and an enlarged ratio position setting surface 248d (see FIGS. 9-A to 9-C). As will be clear from the following description, 1:1 ratio position setting surface 248a of the cam 246 holds the second reflecting mirror assembly 72 at the 1:1 ratio position (shown by the solid lines in FIG. 1), the first reduced ratio position setting surface 248b holds the second reflecting mirror assembly 72 at the first reduced ratio position (shown by the two-dot chain lines 72R$_1$ in FIG. 1), the second reduced ratio position setting surface 248c holds the second reflecting mirror assembly 72 at the second reduced ratio position (the position shown by the two-dot chain lines 72R$_2$ in FIG. 1), and the enlarged ratio position setting surface 248d holds the second reflecting mirror assembly 72 at the enlarged ratio position (shown by the two-dot chain lines 72E in FIG. 1). A cam follower is caused to abut against the peripheral surface of the cam 246. The cam follower is composed of a follower roller 250, and the follower roller 250 is rotatably mounted on the supporting shaft 134. A spring member 252 is interposed between one end of the aforesaid setting member 124 and an engaging member 251 fixed to the rear vertical side plate 88. Hence, the follower roller 250 is pressed elastically against the peripheral surface of the cam 246 by the elastic biasing force of the spring member 252.

The cam 246 is drivingly connected to the stepping motor 244 through a gear train 254. The gear train 254 includes a gear 256 rotating as a unit with the cam 246 and rotatably mounted on the supporting shaft 130. The gear 256 is in mesh with a gear 258 of a linking member 262 having the gear 258 and a gear 260 formed therein and mounted rotatably on the outside surface of the rear vertical side plate 88. The gear 260 of the linking member 262 is in mesh with a gear 264 of a linking member 268 having the gear 264 and a gear 266 formed therein and mounted rotatably on the outside surface of the rear vertical side plate 88. The gear 266 of the linking member 268 is in mesh with a gear 270 mounted rotatably on the outside surface of the rear vertical side plate 88. The gear 270 in turn is in mesh with a gear 274 of a linking member 278 having the gear 274 and a toothed pulley 276 formed therein and mounted rotatably on the outside surface of the rear vertical side plate 88 through a bearing 272. The toothed pulley 276 of the linking member 278 is drivingly connected to a toothed pulley 284 fixed to one output shaft 282 of the stepping motor 244 through a toothed belt 280. Hence, when the stepping motor 244 is rotated counterclockwise (or clockwise) as shown by an arrow 286 (or 288) in FIG. 7, the cam 246 is turned counterclockwise (or clockwise) as shown by an arrow 290 (or 292) through the toothed belt 280, the linking member 278, the gear 270, the linking member 268, the linking member 262 and the gear 256, whereby the follower roller 250 (and therefore, the setting member 124) is moved in the reciprocating direction of the first reflecting mirror assembly 66 and the second reflecting mirror assembly 72. The cam 246 is turned by the rotation of the stepping motor 244 between an angular position (see FIG. 9-C) at which the enlarged ratio position setting surface 248d acts on the follower roller 250 and an angular position (see FIG. 9-B) at which the second reduced ratio position setting surface 248c acts on the follower roller 250.

Now, with reference to FIGS. 3 and 4, the second power transmission system 242 will be described. The second power transmission system 242 includes a pair of stationary pulleys 294 and 296 and a wrapped transmission mechanism 298. The pair of stationary pulleys 294 and 296 are rotatably mounted on supporting shafts 300 and 302 respectively which are set firmly on the base plate 6 at a predetermined distance therebetween in the reciprocating direction of the first and second reflecting mirror assemblies 66 and 72. The wrapped power transmission mechanism 298 is constructed of a rope 304. The rope 304 extends from its one end fixed to the base plate 6 toward a power transmission pulley 198 mounted rotatably on the fixing protruding portion 190 of the supporting block 176 and is wrapped about the pulley 198, then extends toward the stationary pulley 294 and is wrapped about it, then extends toward an idle pulley 310 rotatably mounted on a supporting shaft 308 set firmly in a bracket 306 fixed to the base plate 6 and is wrapped about the pulley 310 from below, further extends to the other output shaft 316 of the stepping motor 244 and is wrapped therearound through several turns, then extends to the idle pulley 310 and is wrapped therearound from above, further extends toward the stationary pulley 296 passing beneath the shaft 316 of stepping motor 244, and is wrapped about the pulley 296, further extends toward the power transmission pulley 198 and is wrapped about the power transmission pulley 198 in a direction opposite to the wrapping direction of the rope 304 on the pulley 198, and further extends toward a bracket 312 mounted adjustably on the base plate 6 and is fixed at its other end to the bracket 312 through a spring member 314.

Accordingly, when the stepping motor 244 is rotated, the power transmission pulley 198 moves with rotation through the rope 304, and as a result, the supporting block 176 (and therefore the lens assembly 74) are moved as a unit with the power transmission pulley 198.

With regard to the movement of the lens assembly 74, the following fact should be borne in mind. Since the rope 304 is wrapped about the pulleys 198, 294 and 296 as stated above, when the stepping motor 244 is rotated to move the rope 304 in the direction shown by an arrow 318 in FIG. 3, the power transmission pulley 198 moves in the direction of an arrow 320 while rotating clockwise in FIG. 3, and as a result, the lens assembly 74 is moved in the direction of the arrow 320 by a distance one-half of the moving distance of the rope 304 according to the movement of the rope 304 in the direction of the arrow 318. Likewise, when the stepping motor 244 is rotated to move the rope 304 in the direction shown by an arrow 322 in FIG. 3, the power transmission pulley 198 moves in the direction of an arrow 324 while rotating counterclockwise in FIG. 3, and as a result, the lens assembly 74 is moved in the direction of the arrow 324 by a distance one-half of the moving distance of the rope 304 according to the movement of the rope 304 in the direction of arrow 322.

The operation of the means 238 for changing the projecting ratio of the optical system 60, which has the structure described above, will be briefly described. In the following, it is assumed that the 1:1 ratio copying is switched over to the first reduced scale copying, the second reduced scale copying or the enlarged scale copying. But the operation is much the same even when switching is done from the first reduced scale copying, the second reduced scale copying or the enlarged scale copying. In the 1:1 ratio copying, it will be easily understood from the foregoing description that the cam 246 is held at an angular position at which the 1:1 ratio position setting surface 248a acts on the follower roller 250 and the second reflecting mirror assembly 72 is held at the 1:1 ratio position shown by the solid lines in FIG. 1 at the start of movement, and at the same time, the lens assembly 74 is held at the 1:1 ratio position shown by the solid lines in FIGS. 1 and 3. In the exposure correcting means 200, the exposure correcting plate 202a, in relation to the aforesaid position of the lens assembly 74, is held at its operating position at which its end portion projects into the light path of the optical system 60 as shown in FIG. 5 and by the solid lines in FIG. 6 (accordingly, in this case, the optical system 60 projects the image of the document onto the electrostatographic material 10 at a ratio of 1:1, and the exposure correcting plate 202a corrects the amount of exposure on the electrostatographic material 10 to an amount optimal for the 1:1 ratio copying).

First, let us assume that the 1:1 ratio copying is switched over to the first reduced scale copying (or the second reduced scale copying). In this case, an electric current having a predetermined number $N_1$ (or $N_2$) of pulses is supplied to the stepping motor 244 in the manner to be described hereinafter to rotate the stepping motor 244 by a predetermined amount in the direction shown by arrow 286 in FIG. 7. As a result, the cam 246 is turned in the direction of an arrow 290 in FIG. 7 through the toothed belt 280, the linking member 278, the gear 270, the linking member 268, the linking member 262 and the gear 256 and is held at an angular position at which the first reduced ratio position setting surface 248b (or the second reduced ratio position setting surface 248c) acts on the follower roller 250. When the cam 246 has been so positioned, the follower roller 250 (and therefore the setting member 124) are moved in the direction of arrow 168 in FIGS. 7 and 9-A (or 9-B) by an amount corresponding to the difference between the radius of the first reduced ratio position setting surface 248b (or the second reduced ratio positioning surface 248c) and the radius of the 1:1 ratio position setting surface 248a, as shown in FIG. 9-A (or 9-B). When the setting member 124 has been so moved, the power transmission pulley 136 is moved as a unit with the setting member 124 while rotating clockwise in FIGS. 7 and 9-A (or 9-B), whereby the moving pulley 114 is moved in the direction of arrow 164 while rotating counterclockwise as viewed from left bottom in FIG. 2 through the rope 116. As a result, the second reflecting mirror assembly 72 is held at the first reduced ratio position (or the second reduced ratio position) shown by the two-dot chain lines $72R_1$ (or $72R_2$) in FIG. 1 at the start of exposure. At the time of this positioning, the moving pulley 114 is moved in the direction of arrow 164 through the rope 116 by the same distance as the moving distance of the setting member 124 according to the movement of the setting member 124 in the direction of arrow 168. Hence, the second reflecting mirror assembly 72 is accurately held at the aforesaid first reduced ratio position (or the second reduced ratio position).

When as stated above the stepping motor 244 is rotated a predetermined amount in the direction of arrow 286 in FIG. 7, the rope 304 is moved in the direction of arrow 318 in FIG. 3, and the power transmission pulley 198 is moved in the direction of arrow 320 clockwise in FIG. 3. As a result, the lens assembly 74 is held at the first reduced ratio position (or the second reduced ratio position) shown by the two-dot chain lines $72R_1$ (or $72R_2$) in FIGS. 1 and 3. Since at the time of this positioning, the lens assembly 74 is moved in the direction of arrow 320 by a distance one-half of the moving distance of the rope 304 corresponding to the movement of the rope 304 in the direction of arrow 318, the lens assembly 74 is accurately positioned at the first reduced ratio position (or the second reduced ratio position). When the lens assembly 74 (and therefore, the supporting block 176) are moved in the direction of arrow 320 and held at the first reduced ratio position (or the second reduced ratio position) shown by the two-dot chain lines $74R_1$ (or $74R_2$), the cam 214 is also moved in the direction of arrow 320 in interlocking relation to the movement of the lens assembly 74, and is held at a position at which the second cam actuating surface 220a (or the third cam: actuating surface 222a) of the second cam surface 220 (or the third cam surface 222) acts on the follower roller 228 (or 230). When the cam 214 is so positioned, the exposure correcting plate 202b (or 202c) is moved upwardly by the action of the second cam actuating surface 220a (or the third cam actuating surface 222a) and is held at an operating position (the position shown by the two-dot chain lines 202B (or 202C) in FIG. 6) at which its end portion projects into the light path of the optical system 60. At this time, the exposure correcting plate 202a is held at a non-operating position deviated from the light path of the optical system 60 by the action of the spring member 236a.

Figure 6:
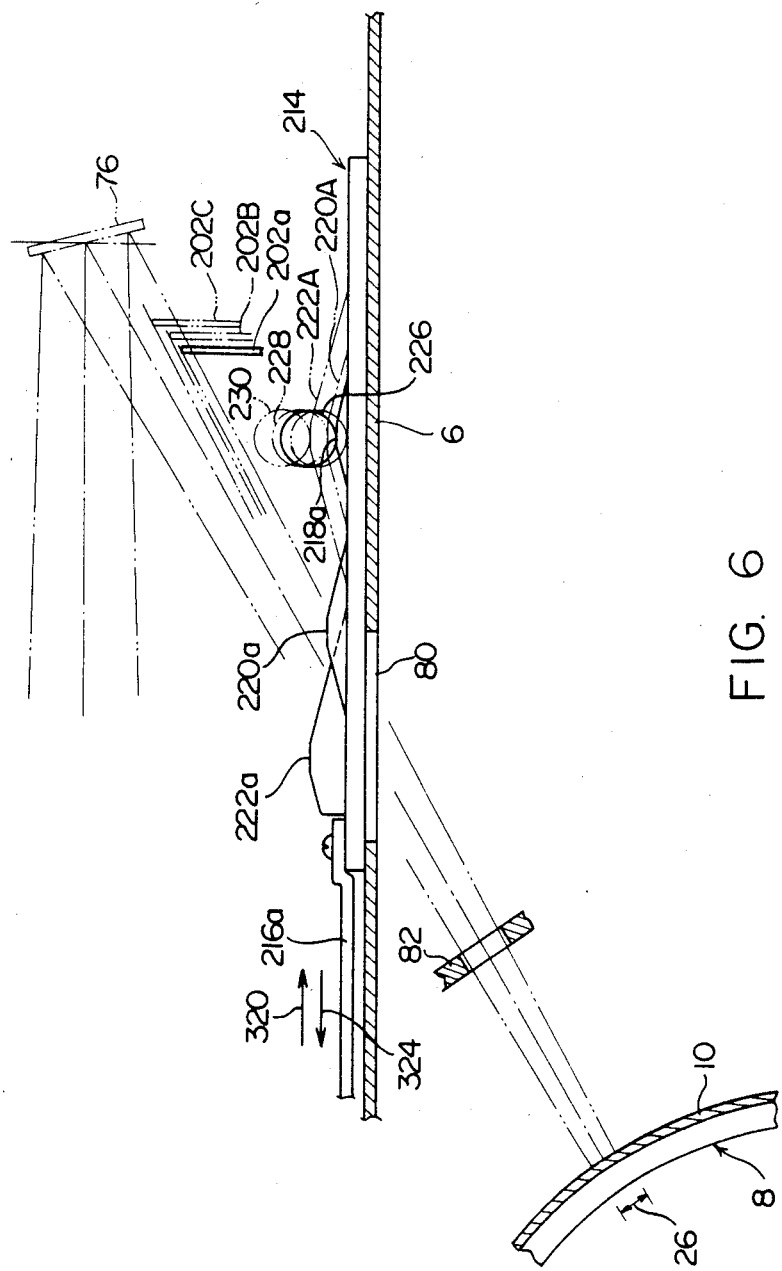
FIG. 6 is a schematic view illustrating the positioning of an exposure correcting plate in the exposure correcting means shown in FIG. 5.

When the 1:1 ratio copying is switched over to the first reduced ratio copying (or the second reduced ratio copying), the lens assembly 74 and the second reflecting mirror assembly 72 are held respectively at the first reduced ratio positions (or the second reduced ratio position) shown by the two-dot chain lines $74R_1$ (or $74R_2$) and $72R_1$ (or $72R_2$) in FIG. 1, and the exposure correcting plate 202b (or 202c) is held at an operating position shown by the two-dot chain lines 202B, (or 202C) in FIG. 6. Accordingly, the optical system 60 reduces the image of the document to about 0.82 (or about 0.7) times and projects it onto the electrostatographic material 10, and the exposure correcting plate 202b (or 202c) corrects the amount of exposure on the electrostatographic material 10 to an amount optimal for the first reduced ratio copying (or the second reduced ratio copying).

Now, let us assume that the 1:1 ratio copying is switched over to the enlarged ratio copying. In this case, an electric current having a predetermined number $N_3$ of pulses is fed into the stepping motor 244 to rotate the stepping motor 244 in the direction of arrow 288 in FIG. 7 by a predetermined amount. As a result, the cam 246 is turned in the direction of an arrow 292 in FIG. 7 through the toothed belt 280, the linking member 278, the gear 270, the linking member 268, the linking member 262 and the gear 256 and is held at an angular position at which the enlarged ratio position setting surface 248d acts on the follower roller 250. When the cam 246 has been so positioned, the follower roller 250 (and therefore, the setting member 124) are moved in the direction of arrow 168 in FIGS. 7 and 9-C by an amount corresponding to the difference between the radius of the enlarged ratio position setting surface and the radius of the 1:1 ratio position setting surface, as shown in FIG. 9-C. When the setting member 124 has been moved in this manner, the power transmission pulley 136 is moved as a unit with the setting member 124 while rotating clockwise in FIGS. 7 and 9-C, whereby the moving pulley 114 is moved in the direction of arrow 164 while rotating counterclockwise as viewed from left bottom in FIG. 2 through the rope 116. As a result, the second reflecting mirror assembly 72 is held at the enlarged ratio position shown by the two-dot chain lines 72E in FIG. 1 at the start of exposure. Since at the time of this positioning, the moving pulley 114 is moved in the direction of arrow 164 through the rope 116 by the same distance as the moving distance of the setting member 124 in response to the movement of the setting member 124 in the direction of arrow 168, the second reflecting mirror assembly 72 is accurately held at the aforesaid enlarged ratio position.

When as stated above the stepping motor 244 is rotated by a predetermined amount in the direction of arrow 288 in FIG. 7, the rope 304 is moved in the direction of arrow 322 in FIG. 3, and the power transmission pulley 198 is moved in the direction of arrow 324 while rotating counterclockwise in FIG. 3. As a result, the lens assembly 74 is held at the enlarged ratio position shown by the two-dot chain lines 72E in FIGS. 1 and 3. Since at the time of this positioning, the lens assembly 74 is moved in the direction of arrow 324 by a distance equal to one half of the moving distance of the rope 304 in response to the movement of the rope 304 in the direction of arrow 322, the lens assembly 74 is accurately held at the aforesaid enlarged ratio position.

When the lens assembly 74 (and therefore the supporting block 176) are moved in the direction of arrow 324 and held at the enlarged ratio position shown by the two-dot chain lines 74E, the cam 214 is also moved in the direction of arrow 324 in FIG. 3 in interlocking relation to the movement of the lens assembly 74, and is held at a position at which none of the first cam actuating surface 218a of the first cam surface 218, the second cam actuating surface 220a of the second cam surface 220 and the third cam actuating surface 222a of the third cam surface 222 act on the follower rollers 226, 228 and 230. When the cam 214 is so positioned, the exposure correcting plates 202a, 202b and 202c are positioned at non-operating positions deviated from the light path of the optical system 60.

When the 1:1 ratio copying is switched over to the enlarged ratio copying, the lens assembly 74 and the second reflecting mirror assembly 72 are held at the enlarged ratio positions shown by the two-dot chain lines 74E and 72E in FIG. 1, and the exposure correcting plates 202a, 202b and 202c are held at non-operating positions deviated from the light path of the optical system 60. Accordingly, although the optical system 60 projects the image of the document at a ratio of about 1.27 onto the electrostatographic material 10, the quantity of exposure on the electrostatographic material 10 is not corrected by the exposure correcting plates 202a, 202b and 202c, and is regulated only by the slit exposure width regulating member 82.

Figure 10:
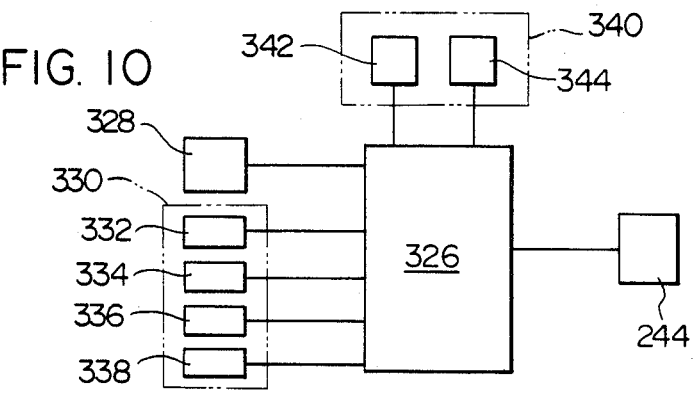
FIG. 10 is a diagram showing a control system for setting a lens assembly and a second reflecting mirror assembly at the required positions.

The operation of the means 238 for changing the projecting ratio of the optical system has been briefly described above. This means 238 further includes a control means 326 (see FIG. 10), conveniently constructed of a microprocessor, for controlling the operation of the stepping motor 244. With reference to FIG. 10 which shows a control system for the stepping motor 244, output signals form a power supply switch 328 and a copying ratio selecting switch 330 are fed into the control means 326. The power supply switch 328 is constructed of a changeover switch means capable of selectively switching over from an open condition to a closed condition or vice versa by manual operation. When the power supply switch 328 is closed, its output signal changes from "L" to "H", and the output signal "H" is fed into the control means 326. The copying ratio selecting switch 330 is comprised of a selective switch means having four automatic reset-type switches, i.e. an enlarged ratio setting switch 332, a 1:1 ratio setting switch 334, a first reduced ratio setting switch 336 and a second reduced ratio setting switch 338. When in the copying ratio setting switch 330, the enlarged ratio setting switch 332 (or the 1:1 ratio setting switch 334, the first reduced ratio setting switch 336 or the second reduced ratio setting switch 338) is depressed, its output signal changes from "L" to "H", and the output signal "H" is fed into the control means 326.

An output signal from a detecting means 340 for detecting the position of the lens assembly 74 is also fed into the control means 326. The detecting means 340 includes a first detector 342 and a second detector 344, and by the cooperative action of the first detector 342 and the second detector 344, the location of the lens assembly 74 at a specified position is detected. The specified position, as used herein, means any of a plurality of positions of the lens assembly 74 corresponding to a plurality of projecting ratios, i.e. the 1:1 ratio position, the first reduced ratio position, the second reduced ratio position and the enlarged ratio position. Preferably, this position is a position existing at one extremity as viewed in the moving direction of the lens assembly 74 (the enlarged ratio position in the illustrated embodiment). The first detector 342 is constructed of an optical detecting means composed of a light emitting element and a light receiving element, and is disposed in the moving path of a rotating plate 346 (constituting a low-speed rotating plate) fixed to the side surface of the cam 246, as shown in FIG. 7. Since the rotating plate 346 is fixed to the cam 246 as can be seen from the above description, it is rotated within a clockwise range between an angular position at which the reduced ratio position setting surface 248c of the cam 246 acts on the follower roller 250 (the angular position shown in FIG. 9-B) and an angular position at which the enlarged ratio position setting surface 248d of the cam 246 acts on the follower roller 250 (the angular position shown in FIG. 9-C) (therefore, even when the lens assembly 74 moves between the second reduced ratio position and the enlarged ratio position, the rotating plate 346 is never rotated through more than one turn). When the rotating 346 rotates and shields the light emitted from the light emitting element to the light receiving element, the output signal of the first detector 342 is changed from "H" to "L". The second detector 344 is also constructed of an optical detecting means consisting of a light emitting element and a light receiving element, and as shown in FIG. 7, is disposed on the peripheral edge portion of a rotating disc 348 (constituting a high-speed rotating plate) rotatably mounted on a supporting shaft 347 set firmly in the rear vertical side plate 88. A toothed pulley 350 is provided in the rotating disc 348, and the toothed belt 280 described hereinabove is wrapped about the toothed pulley 350. As can be easily seen from FIGS. 7 and 8, the cam 246 (and therefore the rotating plate 346) are decelerated through the gear train 254, whereas the rotating disc 348 is rotated through the toothed pulley 280. Hence, the rotating disc 348 is constructed so as to rotate through a plurality of turns while the lens assembly 74 moves between the second reduced ratio position and the enlarged ratio position. The output signal of the second detector 344 changes from "L" to "H" when the rotating disc 348 is rotated and light is emitted from the light emitting element through a cut 352 formed on the peripheral edge of the rotating disc 348 (see FIGS. 9-A to 9-C). In the illustrated embodiment, the detecting means 340 consisting of the first detector 342 and the second detector 344 is constructed that it detects the enlarged ratio position existing at the left extremity as viewed in the moving direction of the lens assembly 74.

In more detail, when the lens assembly 74 is held at the enlarged scale position shown by the two-dot chain lines 74E in FIGS. 1 and 3, the rotating plate 346 is held at an angular position at which it shields light from the light emitting element of the first detector 342, and the rotating disc 348 is held at an angular position at which the light from the light emitting element of the second detector 344 is projected onto the light-receiving element through the cut 352. When the rotating plate 346 and the rotating disc 348 are so positioned, the output signal of the first detector 342 changes from "H" to "L" and the output signal of the second detector 344 changes from "L" to "H". These output signals are fed into the control means 326. Accordingly, in this case, the output signal of the first detector 342 becomes "L", and the output signal of the second detector 344 becomes "H". On the other hand, when the lens assembly 74 is held at a position other than the enlarged ratio position, the rotating plate 346 is held at an angular position apart from the light path where light is projected to the light-receiving element from the light emitting element. Hence, it will be easily understood from the foregoing description, that the output signal of the first detector 342 becomes "H", and the rotating disc 348 rotates through a plurality of turns while the lens assembly 74 moves from the enlarged ratio position to the second reduced ratio position. Hence, the output signal of the second detector 344 becomes "L" or "H". The detecting means 340 detects the positioning of the lens assembly 74 at the enlarged ratio position as a result of the first detector 342 detecting the rotating plate 346 and the second detector 344 detecting the cut 352 of the rotating disc 348 (in other words as a result of the output signal of the first detector 342 becoming "L" and the output signal of the second detector 344 becoming "H"). The detecting means 340 having the aforesaid structure permits accurate detection of the specified position with the simple structure while (a) a detecting means having only the low-speed rotating plate has difficulty in detecting, the specified position accurately, or (b) a control means having only the high-speed rotating plate has the defect of requiring a complex circuit.

On the other hand, the pulse signal produced in the control means 326 based on the above output signals is fed into the stepping motor 244.

Figure 11:
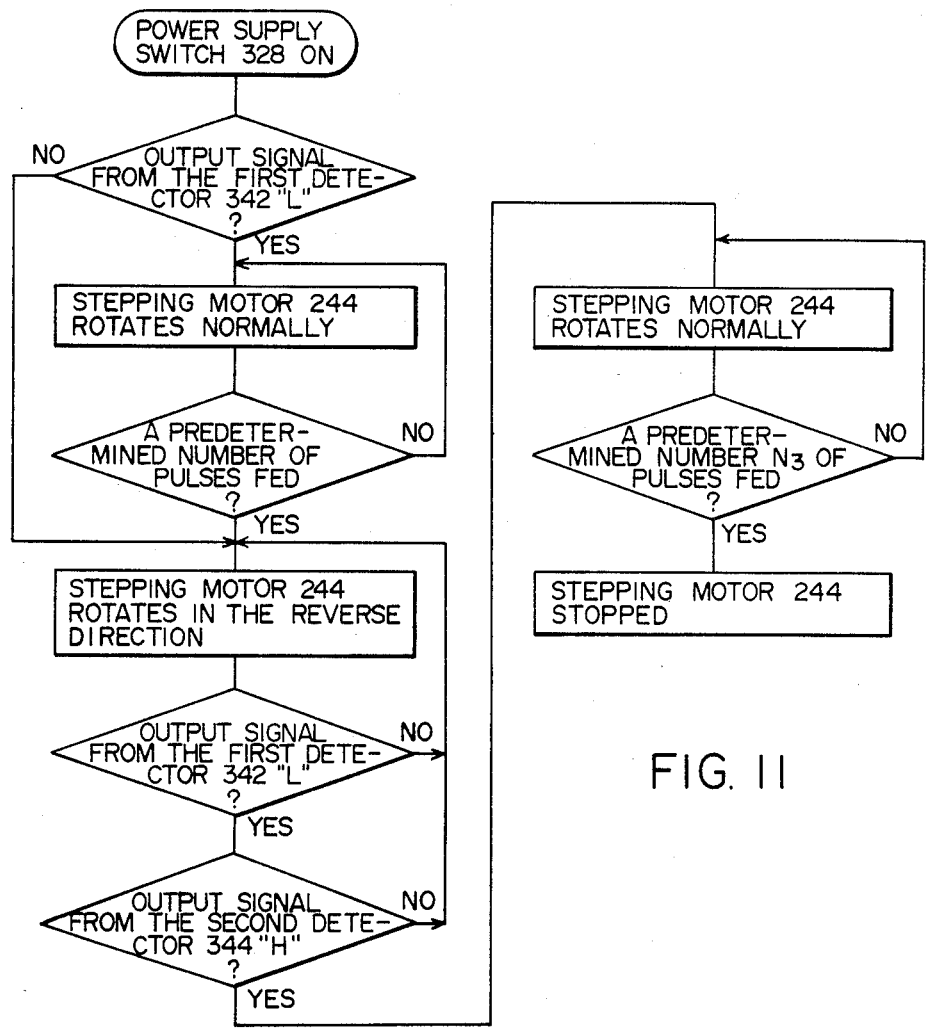
FIG. 11 is a flow chart showing the method of controlling the optical system of the variable magnification electrostatic copying apparatus shown in FIG. 1.

One method of positioning the lens assembly 74 and the second reflecting mirror assembly 72 will be described with reference to FIG. 11 which is a flow chart showing the method of controlling by the control means 326 composed of a microprocessor.

When power is applied by closing the power supply switch 328 provided on an operation panel (not shown), it is first determined whether or not the output signal of the first detector 342 is "L". When as a result, the output signal of the first detector 342 is determined to be "L" (in other words, when the lens assembly 74 is accurately held at the enlarged ratio position or when it is held at the enlarged ratio position but not accurately), electric current having a predetermined number of pulses for normal rotation is supplied to the stepping motor 244 from the control means 326 to rotate the stepping motor 244 in the direction shown by arrow 286 in FIG. 7 (i.e., rotate normally), and it continues to rotate in that direction until the supply of current having the predetermined number of pulses is over. When the supply of current having the predetermined number of pulses for the above normal rotation is over, a pulse current for reverse rotation continues to be supplied to the stepping motor 244 from the control means 326, and the stepping motor 244 continues to rotate in the direction of arrow 288 in FIG. 7 (i.e., rotate in the reverse direction). When the above rotation is started, it is first determined whether or not the output signal of the first detector 342 is "L", and whether or not the output signal from the second detector 344 is "H". When the output signal of the first detector 342 becomes "L" and the output signal of the second detector 344 becomes "H" (in other words, when the lens assembly 74 is held accurately at the aforesaid enlarged ratio position), the supply of the pulse current for reverse rotation is stopped, and instead, a current having a predetermined number $N_3$ of pulses (the number of pulses required to move the lens assembly 74 from the enlarged ratio position to the 1:1 ratio position) for normal rotation is fed into the stepping motor 244.

When as a result of judgement, the output signal of the first detector 342 is found to be "H" (in other words, when the lens assembly 74 is held at a position other than the enlarged ratio position), a pulse current for reverse rotation is continuously supplied to the stepping motor 244 from the control means 326, and the stepping motor 244 continues to rotate in the direction of arrow 288 in FIG. 7 (i.e., rotate in the reverse direction). When the above rotation is started, it is determined whether or not the output signal of the first detector 342 is "L" and the output signal of the second detector 344 is "H". When the output signal fo the first detector 342 becomes "L" and the output signal of the second detector 344 becomes "H" (in other words, when the lens assembly 74 is held accurately at the enlarged ratio position), the supply of the pulse current for reverse rotation is stopped, and instead, a current of the aforesaid predetermined number $N_3$ of pulses for normal rotation is supplied to the stepping motor 244. Accordingly, when at the time of applying power, the first detector 342 detects the rotating plate 346, the lens assembly 74 is moved by a predetermined distance (corresponding to the predetermined number of pulses) in the direction shown by arrow 162 in FIGS. 1 and 2 (i.e., the direction moving from the enlarged ratio position to the second reduced ratio position), then is moved in the direction of arrow 164 in FIGS. 1 and 2 (i.e., the direction moving from the second reduced ratio position toward the enlarged ratio position) and is held at the aforesaid enlarged ratio position. On the other hand, when the first detector 342 has not detected the rotating plate 346, the lens assembly 74 is moved in the direction of arrow 164 in FIGS. 1 and 2 (i.e., in the direction moving from the second reduced ratio position toward the enlarged ratio position) and is held at the aforesaid enlarged ratio position.

When the lens assembly 74 is held at the aforesaid enlarged ratio position, the current having the predetermined number $N_3$ of pulses for normal rotation is supplied to the stepping motor 244 to rotate the stepping motor 244 in the direction of arrow 286 in FIG. 7 (i.e., rotate normally). When the rotation of the stepping motor 244 is started, it is judged whether the current having the predetermined number $N_3$ of pulses has been supplied, and until the supply of the current is terminated, the stepping motor 244 continues to rotate in the direction of arrow 286. When the supply of the current having the predetermined number $N_3$ of pulses for normal rotation is stopped, the rotation of the stepping motor 244 is stopped. As a result, the lens assembly 74 is held at the aforesaid 1:1 ratio position. In the illustrated embodiment the second reflecting mirror assembly 72 is also positioned in interlocking relation to the positioning of the lens assembly 74 by the stepping motor 244. Accordingly, it will be readily understood that when the lens assembly 74 is held at the aforesaid enlarged ratio position, the 1:1 ratio position, etc., the second reflecting mirror assembly 72 is also held at the aforesaid enlarged ratio position, the 1:1 ratio position, etc. corresponding to the position of the lens assembly 74.

Thus, whether at the time of applying power, the lens assembly 74 and the second reflecting assembly 72 are held at any of the positions (including the aforesaid 1:1 ratio position, and the enlarged ratio position), the lens assembly 74 and the second reflecting mirror assembly 72 are held at the aforesaid enlarged ratio position and then are held accurately at the 1:1 ratio position. Since in many cases it is desired to copy a document substantially at a 1:1 ratio, it is convenient that the lens assembly 74 and the second reflecting mirror assembly 72 are automatically held at the 1:1 ratio position without requiring any manual operation (without depressing the 1:1 ratio setting switch 334) at the time of applying power. It may happen that when it is desired to hold the lens assembly 74 at the 1:1 ratio position, the lens assembly 74 was not accurately held at the aforesaid enlarged ratio position in the previous copying cycle. Hence, it is convenient to hold the lens assembly 74 again at the enlarged ratio position accurately even when it is positioned at the enlarged ratio position at the time of applying power.

When after the termination of the movement at the time of applying power, the enlarged ratio setting switch 332 (or the first reduced ratio setting switch 336 or the second reduced ratio setting switch 338) is depressed, the output signal "H" of the enlarged ratio setting switch 332 (or the first reduced ratio setting switch 336 or the second reduced ratio setting switch 338) is fed into the control means 326. Based on this signal, a pulse current generated in the control means 326 is supplied to the stepping motor 244, and as a result, the lens assembly 74 and the second reflecting mirror assembly 72 are accurately held at the enlarged ratio position (or the first reduced ratio position, or the second reduced ratio position). In the control means 326 of the illustrated embodiment, a predetermined pulse number $N_3$ required to move the lens assembly 74 from the enlarged ratio position to the 1:1 ratio position, a predetermined pulse number $N_4$ required to move the lens assembly from the enlarged ratio position to the first reduced ratio position and a predetermined pulse number $N_5$ required to move the lens assembly 74 from the aforesaid enlarged ratio position to the second reduced ratio position are first stored using the enlarged ratio position as a standard. When a new copying magnification is selected, the difference between a predetermined pulse number required to move the lens assembly 74 to a predetermined position corresponding to the newly selected copying magnification and a predetermined pulse number required to move the lens assembly 74 to a predetermined position corresponding to the previously selected copying magnification is determined in the control means 326. Based on this difference (for example, when the lens assembly 74 is moved from the 1:1 ratio position to the first or second reduced ratio position, this difference is $N_1 = N_4 - N_3$ or $N_2 = N_5 - N_3$) the rotating direction of the stepping motor 244 (more specifically, normal rotation when the difference is a positive value and reverse rotation when it is a negative value) and the amount of its rotation (more specifically, the absolute value of the above difference becomes the number of pulses to be fed into the stepping motor 244) are determined. Accordingly, the aforesaid positioning is effected by controlling the pulse current fed into the stepping motor 244 using the enlarged ratio position as a standard.

In the variable magnification electrostatic copying apparatus, the lens assembly 74 and the second reflecting mirror assembly 72 are held at any of a plurality of required positions corresponding respectively to a plurality of projecting ratios as stated above. Hence, they can be accurately held at the required position and the positioning can be controlled with simplicity. Furthermore, by setting the aforesaid specified position at a position existing at one extremity of the plurality of required positions, the positioning of the lens assembly 74 is simpler.

While the invention has been described hereinabove with regard to one specific embodiment of the variable magnification electrostatic copying apparatus constructed in accordance with this invention, this invention is not restricted to this specific embodiment, and various changes and modifications are possible without departing from the scope of the invention.

For example, in the exposure correcting means in the specific embodiment, all of the exposure correcting plates are held at non-operating positions at the time of enlarged scale copying (when the lens assembly and the second reflecting mirror assembly are held at enlarged ratio positions). If desired, it is possible to provide an additional exposure correcting plate, to hold this exposure correcting plate at its operating position at the time of enlarged scale copying and thus to correct the quantity of exposure on the electrostatographic material.

What is claimed is:

1. A variable magnification electrostatic copying apparatus comprising a stationary transparent plate for placing thereon a document to be copied, an optical system for projecting an image of the document onto an electrostatographic material at a desired projecting ratio selected from a plurality of projecting ratios in an exposure zone along the moving path of the electrostatographic material, said optical system including a first reflecting mirror assembly to be moved reciprocally along the transparent plate, a second reflecting mirror assembly to be moved reciprocally at a speed one-half of the moving speed of the first reflecting mirror assembly in synchronism with the reciprocal movement of the first reflecting mirror assembly and substantially parallel to the reciprocating direction of the first reflecting mirror assembly, and a lens assembly to be held at any of a plurality of positions corresponding to the plurality of projecting ratios, the projecting ratio being changed by changing the position of the lens assembly and the position of the second reflecting mirror assembly relative to the first reflecting mirror assembly in the reciprocating direction of the second reflecting mirror assembly, a driving means for moving the first reflecting mirror assembly and the second reflecting mirror assembly reciprocally, and a projecting ratio changing means for moving the lens assembly and the second reflecting mirror assembly so as to change the projecting ratio of the optical system, said projecting ratio changing means including a drive source for changing the projecting ratio, a control means for controlling the operation of said drive source, a setting member adapted to be held at any of a plurality of positions corresponding to the plurality of projecting ratios for moving the second mirror assembly, a first power transmission system interposed between the drive source and the setting member, and a second power transmission system, said first power transmission system including a cam drivingly connected to the drive source and a cam follower mounted on the setting member and cooperatively acting with the cam, and the second power transmission system including a wrapped power transmission mechanism disposed between the drive source and the lens assembly, and wherein when the drive source is operated, the second reflecting mirror assembly is moved through the first power transmission system and the setting member, and the lens assembly is moved through the second power transmission system.

2. The appratus of claim 1 wherein
said driving means includes a pair of spaced stationary pulleys rotatably mounted in the reciprocating direction of the first and second reflecting mirror assemblies, a moving pulley mounted rotatably on the second reflecting mirror assembly and a rope wrapped about the pair of stationary pulleys and the moving pulley and fixed to the first reflecting mirror assembly,
the projecting ratio changing means has rotatably mounted thereon a power transmission pulley,
each of the free end portions of the rope in the driving means is wrapped about the moving pulley, then wrapped about each of a pair of spaced stationary guide pulleys mounted in the moving direction of the setting member, then wrapped about the power transmission pulley and is then fixed to a predetermined fixed position, and
when the setting member is moved, the power transmission pulley is rotated accordingly, and according to the rotation of the power transmission pulley, the moving pulley is rotated to move the second reflecting mirror assembly.

3. The apparatus of claim 1 wherein the cam in the first power transmission system is constructed of a rotating cam plate having a plurality of arcuate positioning surfaces of different radii on its circumferential surface, the cam follower is constructed of a follower roller mounted rotatably on the setting member, and a spring member is provided which elastically biases the setting member to cause the follower roller to abut against the cam plate elastically.

4. The apparatus of claim 3 wherein the rotating cam plate is drivingly connected through a gear train to the drive source for changing the projecting ratio.

5. The apparatus of claim 1 wherein
the wrapped power transmission mechanism in the second power transmission system is constructed of a rope wrapped about a plurality of stationary pulleys and drivingly connected to said drive source for changing the projecting ratio,
the lens assembly has rotatably mounted thereon a power transmission pulley,
each of the two free end portions of the rope in the second power transmission system is wrapped about the power transmission pulley and then fixed at a predetermined fixed position, and
when the rope is driven by said drive source for the changing of the projecting ratio, the power transmission pulley is correspondingly rotated to move the lens assembly.

6. The appratus of claim 1 wherein the optical system further includes at least one exposure correcting plate mounted for free movement between an operating position at which it projects into a light path ranging from the document to the electrostatographic material and a non-operating position deviated from the light path, spring means for elastically biasing the exposure correcting plate to either one of the operating position and the non-operating position, and moving means for moving the exposure correcting plate to the other of the operating and non-operating positions against the elastic biasing action of the spring means according to the position of the lens assembly held at any one of the plurality of positions corresponding to the plurality of projecting ratios.

7. The apparatus of claim 6 wherein the spring means elastically biases the exposure correcting plate to the non-operating position, and the moving means moves the exposure correcting plate to the operating position.

8. The apparatus of claim 6 wherein the moving means comprises a cam to be moved incident to the movement of the lens assembly and a cam follower mounted on the exposure correcting plate and acting in cooperation with the cam.

9. The apparatus of claim 8 wherein the cam is constructed of a translation cam fixed to the lens assembly, and the cam follower is constructed of a follower roller rotatably mounted on the exposure correcting plate.

10. The apparatus of claim 1 wherein the projecting ratio changing means further comprises a detecting means for detecting the lens assembly when the lens assembly is at a specified position, the drive source for the changing of the projecting ratio is a stepping motor to be driven by the supply of a pulse current, and the control means controls the supply of a pulse current to the stepping motor on the basis of said specified position of the lens assembly.

11. The apparatus of claim 10 wherein said specified position of the lens assembly is at one extremity of the plurality of positions corresponding to the plurality of projecting ratios when viewed in the moving direction of the lens assembly.

12. The apparatus of claim 11 wherein said detecting means includes a low-speed rotating plate drivingly connected to said drive source for the changing of the projecting ratio, a high-speed rotating plate drivingly connected to said drive source, a first detector for detecting the low-speed rotating plate when the low-speed rotating plate is at a predetermined angular position, and a second detector for detecting the high-speed rotating speed when the high-speed rotating plate is at a predetermined angular position, while the lens assembly is moved from said specified position at said one extremity of the plurality of positions to the other extremity, the low-speed rotating plate is rotated through less than one turn and the high-speed rotating plate is rotated a plurality of turns, and when the lens assembly is held at said specified position, the low-speed rotating plate is at said predetermined angular position and is detected by the first detector and at the same time the high-speed rotating plate is at said predetermined position and is detected by the second detector.

13. The apparatus of claim 12 wherein said control means controls the supply of the pulse current to the stepping motor at the time of applying power, in such a manner that (a) when the first detector has not detected the location of the low-speed rotating plate at said predetermined angular position, said control means moves the lens assembly in a direction from said other extremity toward said specified position until the first detector detects the location of the low-speed rotating plate at said predetermined angular position and the second detector detects the location of the high-speed rotating plate at said predetermined angular position, and thus holds the lens assembly at said specified position; and (b) when the first detector has detected the location of the low-speed rotating plate at said predetermined angular position, said control means moves the lens assembly by a predetermined distance in a direction from said specified position toward said other extremity, moves the lens assembly in a direction from said other extremity toward said specified position until the first detector detects the location of the low-speed rotating plate at said predetermined angular position and the second detector detects the location of the high-speed rotating plate at said predetermined angular position, and thus holds the lens assembly at said specified position.

14. The apparatus of claim 10 wherein one of the plurality of projecting ratios is 1:1, and a 1:1 ratio position corresponding to the 1:1 ratio among the plurality of positions of the lens assembly is different from said specified position, and said control means controls the supply of the pulse current to the stepping motor at the time of applying power, in such a manner that it holds the lens assembly at said 1:1 position after it has been held at said specified position.

15. A variable magnification electrostatic copying apparatus comprising a transparent plate for placing thereon a document to be copied, an optical system for projecting an image of the document on an electrostatographic material at any desired projecting ratio selected from a plurality of projecting ratios in an exposure zone along the moving path of the electrostatographic material, said optical system including at least one optical element assembly adapted to be held at any one of a plurality of positions corresponding to the plurality of projecting ratios and remaining held at said position during the performance of said projection, and a projecting ratio changing means for moving said optical element assembly so as to change the projecting ratio of the optical system said optical system further including at least one exposure correcting plate mounted for free movement between an operating position at which it projects into a light path ranging from the document to the electrostatographic material and a non-operating position at which it deviates from the light path, spring means for elastically biasing the exposure correcting plate to one of the operating and non-operating positions, and moving means for moving the exposure correcting plate to the other of the operating and non-operating positions against the elastic biasing action of the spring means according to the position of the optical element assembly to be held at any one of the plurality of positions corresponding to the plurality of projecting ratios.

16. The apparatus of claim 15 wherein said spring means elastically biasing the exposure correcting plate to said non-operating position and said moving means moves the exposure correcting plate to said operating position.

17. The apparatus of claim 15 wherein said moving means includes a cam to be moved incident to the movement of the optical element assembly and a cam follower mounted on the exposure correcting plate and acting in cooperation with the cam.

18. The apparatus of claim 17 wherein the cam is constructed of a translation cam fixed to the optical element assembly, and the cam follower is constructed of a follower roller mounted rotatably on the exposure correcting plate.

19. A variable magnification electrostatic copying apparatus comprising a transparent plate for placing thereon a document to be copied, an optical system for projecting an image of the document onto an electrostatographic material at any desired projecting ratio selected from a plurality of projecting ratios in an exposure zone along the moving path of the electrostatographic material, said optical system including at least one optical element assembly to be held at any one of a plurality of positions corresponding to the plurality of projecting ratios, and a projecting ratio changing means for moving the optical element assembly so as to change the projecting ratio of the optical system, said projecting ratio changing means including a stepping motor to be driven by supplying a pulse current, a power transmission system interposed between the stepping motor and the optical element assembly, a detecting means for detecting the optical element assembly when said optical element assembly is at a specified position at one extremity of the plurality of positions corresponding to the plurality of projecting ratios when viewed in the moving direction of the optical element assembly, and a control means for controlling the supply of a pulse current to the stepping motor on the basis of said specified position of the optical element assembly, said detecting means including a low-speed rotating plate drivingly connected to said stepping motor, a high-speed rotating plate drivingly connected to said stepping motor, a first detector for detecting the low-speed rotating plate when the low-speed rotating plate is at a predetermined angular position and a second detector for detecting the high-speed rotating plate when the high-speed rotating plate is at a predetermined angular position, whereby when the optical element assembly is moved from said specified position at one extremity of the plurality of positions to the other extremity, the low-speed rotating plate is rotated over a range not exceeding one turn and the high-speed rotating plate is rotated a plurality of turns, and when the optical element assembly is at said specified position, the low-speed rotating plate is at said predetermined angular position and is detected by the first detector and simultaneously the high-speed rotating plate is at said predetermined angular position and is detected by the second detector.

20. The apparatus of claim 19 wherein said control means control the supply of the pulse current to the stepping motor at the time of applying power, in such a manner that (a) when the first detector has not detected the location of the low-speed rotating plate at said predetermined angular position, said control means moves the optical element assembly in a direction from said other extremity toward said specified position until the first detector detects the location of the low-speed rotating plate at said predetermined angular position and the second detector detects the location of the high-speed rotating plate at said predetermined angular position, and thus holds the optical element assembly at said specified position; and (b) when the first detector has detected the location of the low-speed rotating plate at said predetermined angular position, said control means moves the lens assembly by a predetermined distance in a direction from said specified position toward said other extremity, moves the optical element assembly in a direction from said other extremity toward said specified position until the first detector detects the location of the low-speed rotating plate at said predetermined angular position and the second detector detects the location of the high-speed rotating plate at said predetermined angular position, and thus holds the optical element assembly at said specified position.

21. The apparatus of claim 19 wherein one of the plurality of projection ratios is a 1:1 ratio, and a 1:1 ratio position of the optical element assembly among the plurality of positions which corresponds to 1:1 is different from the said specified position, and said control means controls the supply of the pulse current to the stepping motor at the time of applying power, in such a manner that the optical element assembly is held at the 1:1 ratio position after it has been held at said specified position.

22. A variable magnification electrostatic copying apparatus comprising a transparent plate for placing thereon a document to be copied, an optical system for projecting an image of the document at any desired projecting ratio selected from a plurality of projecting ratios, said optical system including at least one optical element assembly to be held at any one of a plurality of positions corresponding to the plurality of projecting ratios, and a means for moving the optical element assembly so as to change the projecting ratio of the optical system, said projecting ratio changing means including drive source for changing the projecting ratio, a power transmission system interposed between said drive source and the optical element assembly, a detecting means for detecting the optical element assembly when the optical element assembly is at a specified position, and a control means for controlling the operation of said drive source according to an output signal of the detecting means; said detecting means including a low-speed rotating plate drivingly connected to said drive source, a high-speed rotating plate drivingly connected to said drive source, a first detector for detecting the low-speed rotating plate when said plate is at a predetermined angular position, and a second detector for detecting the high-speed rotating plate when said plate is at a predetermined angular position, and when the optical element assembly is moved from said specified position existing at said one extremity of the plurality of positions to a position existing at the other extremity end, the low-speed rotating plate is rotated through not more than one turn and the high-speed rotating plate is rotated through a plurality of turns, and when the optical element assembly reaches said specified position, the low-speed rotating plate is at the predetermined angular position and is detected by the first detector and the high-speed rotating plate is at the predetermined angular position and is detected by the second detector.

23. The apparatus of claim 22 wherein each of the first and second detectors is comprised of a combination of a light emitting element and a light receiving element, and when each of the low-speed rotating plate and the high-speed rotating plate is at said predetermined angular position, the light emitting element and the light receiving element of each of the first and second detectors are optically shut off or connected.

* * * * *